(12) United States Patent
Gaab et al.

(10) Patent No.: US 11,577,981 B2
(45) Date of Patent: Feb. 14, 2023

(54) METHODS FOR SEPARATING TRANSPARENT ARTICLES FROM A TRANSPARENT MOTHER SHEET USING AN OPEN ENDED PRESSURE ASSEMBLY

(71) Applicant: CORNING INCORPORATED, Corning, NY (US)

(72) Inventors: Andreas Simon Gaab, Grobenzell (DE); Michael Albert Joseph, II, Corning, NY (US); Albert Roth Nieber, Painted Post, NY (US); John Charles Speeckaert, Painted Post, NY (US); Sergio Tsuda, Horseheads, NY (US); Heather Nicole Vanselous, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 209 days.

(21) Appl. No.: 16/929,924

(22) Filed: Jul. 15, 2020

(65) Prior Publication Data
US 2021/0017064 A1    Jan. 21, 2021

Related U.S. Application Data

(60) Provisional application No. 62/875,731, filed on Jul. 18, 2019.

(51) Int. Cl.
*C03B 33/033* (2006.01)
*C03B 33/02* (2006.01)
*C03B 33/03* (2006.01)

(52) U.S. Cl.
CPC ........ *C03B 33/033* (2013.01); *C03B 33/0222* (2013.01); *C03B 33/03* (2013.01)

(58) Field of Classification Search
None
See application file for complete search history.

(56) References Cited

U.S. PATENT DOCUMENTS 1,920,641 A * 8/1933 Heichert ............... C03B 33/033
269/21
5,143,196 A * 9/1992 Henn .................... B24B 41/068
198/465.2

(Continued)

FOREIGN PATENT DOCUMENTS

JP      2000-006100 A    1/2000
WO    2016/001114 A1    1/2016

(Continued)

OTHER PUBLICATIONS

A. E. Siegman, "New Developments in Laser Resonators", Invited Paper, SPIE vol. 1224 Optical Resonators, 1990, pp. 2-14.

(Continued)

*Primary Examiner* — Queenie S Dehghan
(74) *Attorney, Agent, or Firm* — Amy T. Lang; John P. McGroarty

(57) ABSTRACT

A method of separating a transparent mother sheet includes contacting a first surface of the transparent mother sheet with an open ended pressure assembly including a pressure vessel shell, thereby forming a shell cavity defined by the first surface of the transparent mother sheet and the pressure vessel shell, where the transparent mother sheet comprises a damage path. The method also includes removing gas from the shell cavity through a fluid removal outlet extending through the pressure vessel shell to reduce a cavity pressure in the shell cavity, thereby applying stress to the damage path to separate a portion of the transparent mother sheet along the damage path.

18 Claims, 14 Drawing Sheets

(56) References Cited

U.S. PATENT DOCUMENTS

| | | | |
|---|---|---|---|
| 5,826,772 | A | 10/1998 | Ariglio et al. |
| 8,292,141 | B2 | 10/2012 | Cox et al. |
| 9,802,854 | B2 | 10/2017 | Bayne et al. |
| 9,896,373 | B2 | 2/2018 | Johnson et al. |
| 2012/0047956 | A1 | 3/2012 | Li |
| 2013/0192305 | A1 | 8/2013 | Black et al. |
| 2015/0144676 | A1 | 5/2015 | Johnson et al. |
| 2015/0166396 | A1 | 6/2015 | Marjanovic et al. |
| 2016/0009586 | A1 | 1/2016 | Bookbinder et al. |
| 2018/0057390 | A1* | 3/2018 | Hackert ............... B23K 26/364 |
| 2018/0062342 | A1* | 3/2018 | Comstock, II .......... H01S 3/061 |

FOREIGN PATENT DOCUMENTS

| | | | |
|---|---|---|---|
| WO | 2017/192835 A1 | 11/2017 | |
| WO | WO-2018200454 A1 * | 11/2018 | ......... B23K 26/0006 |

OTHER PUBLICATIONS

Borghi et al., "M2 factor of Bassel-Gauss Beams", Optics Letters, vol. 22, No. 5, 1997, pp. 262-264.

International Search Report and Written Opinion of the International Searching Authority; PCT/US2020/040966; dated Sep. 10, 2020; 10 Pages; European Patent Office.

* cited by examiner

METHODS FOR SEPARATING TRANSPARENT ARTICLES FROM A TRANSPARENT MOTHER SHEET USING AN OPEN ENDED PRESSURE ASSEMBLY

This application claims the benefit of priority under 35 U.S.C. § 119 of U.S. Provisional Application Ser. No. 62/875,731 filed on Jul. 18, 2019 the content of which is relied upon and incorporated herein by reference in its entirety.

BACKGROUND

Field

The present specification generally relates to apparatuses and methods for separating brittle substrates, such as glass substrates, glass-ceramic substrates.

Technical Background

The area of laser processing of materials encompasses a wide variety of applications that involve cutting, drilling, milling, welding, melting, etc. of different types of materials. Among these processes, one that is of particular interest is cutting or separating transparent substrates in a process that may be utilized in the production of glass or other transparent materials for a variety of applications, including vehicle glass such as vehicle windows and windshields.

From process development and cost perspectives there are many opportunities for improvement in cutting and separating glass substrates. It is of great interest to have a faster, cleaner, cheaper, more repeatable, and more reliable method of separating glass substrates than what is currently practiced in the market. Accordingly, a need exists for alternative improved methods for separating glass substrates.

SUMMARY

According to a first embodiment, a method of separating a transparent mother sheet includes contacting a first surface of the transparent mother sheet with an open ended pressure assembly including a pressure vessel shell, thereby forming a shell cavity defined by the first surface of the transparent mother sheet and the pressure vessel shell, where the transparent mother sheet comprises a damage path. The method also includes removing gas from the shell cavity through a fluid removal outlet extending through the pressure vessel shell to reduce a cavity pressure in the shell cavity, thereby applying stress to the damage path to separate a portion of the transparent mother sheet along the damage path.

A second embodiment includes the method of the first embodiment, wherein the damage path is a closed damage path.

A third embodiment includes the method of the first embodiment, wherein the damage path extends from a first location on an edge of the transparent mother sheet to a second location on the edge of the transparent mother sheet.

A fourth embodiment includes the method of any of the previous embodiments, wherein reducing the cavity pressure in the shell cavity flexes the transparent mother sheet thereby applying stress to the damage path.

A fifth embodiment includes the method of the fourth embodiment, wherein the stress applied to the damage path comprises multi-axial stress.

A sixth embodiment includes the method of the fourth or fifth embodiments, wherein stress is applied to the damage path at both the first surface and a second surface, opposite the first surface.

A seventh embodiment includes the method of any of the previous embodiments, wherein, when removing gas from the shell cavity, the cavity pressure reaches a minimum pressure of 0.1" Hg to 1" Hg.

An eighth embodiment includes the method of any of the previous embodiments, wherein the pressure vessel shell includes an outer surface, an inner surface, and an end surface and the fluid removal outlet extends from the outer surface to the inner surface.

A ninth embodiment includes the method of the eighth embodiment, wherein the open ended pressure assembly further includes a perimeter seal coupled to the end surface of the pressure vessel shell.

A tenth embodiment includes the method of the ninth embodiment, wherein the perimeter seal includes a polymer material, a foam material, or a combination thereof.

An eleventh embodiment includes the method of any of the previous embodiments, wherein when contacting the first surface of the transparent mother sheet with the open ended pressure assembly, the damage path circumscribes the pressure vessel shell.

A twelfth embodiment includes the method of the eleventh embodiment and further includes removing gas from the shell cavity through the fluid removal outlet to retain the cavity pressure in the shell cavity below a pressure outside the shell cavity such that a transparent article separated from the transparent mother sheet is engaged with the open ended pressure assembly and transporting the transparent article away from a trim portion of the transparent mother sheet using the open ended pressure assembly.

A thirteenth embodiment includes the method of any of the previous embodiments, wherein the open ended pressure assembly further includes a membrane skirt removably engageable with the pressure vessel shell.

A fourteenth embodiment includes the method of the thirteenth embodiment, wherein a portion of the pressure vessel shell extends beyond an edge of the transparent mother sheet forming an opening and the membrane skirt is engaged with the pressure vessel shell and contacts the first surface of the transparent mother sheet to cover the opening.

A fifteenth embodiment includes the method of the thirteenth embodiment, wherein the membrane skirt includes an outer edge and an interior hole comprising a hole perimeter.

A sixteenth embodiment includes the method of the fifteenth embodiment, wherein when contacting the first surface of the transparent mother sheet with the open ended pressure assembly the damage path circumscribes the hole perimeter of the interior hole of the membrane skirt.

A seventeenth embodiment includes the method of any of the previous embodiments, wherein the open ended pressure assembly further includes a pressure source fluidly coupled to the fluid removal outlet.

An eighteenth embodiment includes the method of any of the previous embodiments, wherein the pressure vessel shell further includes a pressure release opening actuatable between an open position and a closed position.

A nineteenth embodiment includes the method of any of the previous embodiments, wherein the open ended pressure assembly further includes a manipulator arm having a first end coupled to the pressure vessel shell and a second end coupled to a gantry.

A twentieth embodiment includes the method of any of the previous embodiments, and further includes forming the damage path in the transparent mother sheet before contacting the first surface of the transparent mother sheet with the open ended pressure assembly.

A twenty-first embodiment includes the method of the twentieth embodiment, wherein the damage path is a contour having a plurality of defects in the transparent mother sheet. Further, forming the contour includes directing a pulsed laser beam oriented along a beam pathway and output by a beam source into the transparent mother sheet such that a portion of the pulsed laser beam directed into the transparent mother sheet is a pulsed laser beam focal line and generates an induced absorption within the transparent mother sheet, the induced absorption producing a defect within the transparent mother sheet; and translating at least one of the transparent mother sheet and the pulsed laser beam relative to each other along a contour line, thereby laser forming defects along the contour line within the transparent mother sheet.

A twenty-second embodiment includes the method of the twenty-first embodiment, wherein the pulsed laser beam traverses an aspheric optical element before irradiating the transparent mother sheet.

A twenty-third embodiment includes the method of the twenty-first or the twenty-second embodiment, wherein the pulsed laser beam focal line includes a wavelength $\lambda$, a spot size $w_o$, and a Rayleigh range $Z_R$ that is greater than $$F_D \frac{\pi w_0^2}{\lambda},$$

where $F_D$ is a dimensionless divergence factor comprising a value of 10 or greater.

A twenty-fourth embodiment includes the method of the twenty-third embodiment, wherein the dimensionless divergence factor $F_D$ has a value of from 10 to 2000.

A twenty-fifth embodiment includes the method of any of the twenty-first through the twenty-fourth embodiment, wherein a spacing between adjacent defects is 50 µm or less.

A twenty-sixth embodiment includes the method of any of the twenty-first through the twenty-fifth embodiment, wherein the pulsed laser beam has a wavelength k and wherein the transparent mother sheet has combined losses due to linear absorption and scattering less than 20%/mm in a beam propagation direction.

A twenty-seventh embodiment includes the method of any of the twenty-first through the twenty-sixth embodiment, wherein the beam source is a pulsed beam source that produces pulse bursts with from 2 sub-pulse per pulse burst to 30 sub-pulses per pulse burst and a pulse burst energy is from 100 µJ to 600 µJ per pulse burst.

A twenty-eighth embodiment includes the method of any of the twenty-first through the twenty-seventh embodiment, wherein the damage path is formed by scoring or laser ablation.

A twenty-ninth embodiment includes the method of the twentieth embodiment, wherein forming the score line includes engaging the first surface or the second surface of the transparent mother sheet with a mechanical scoring device and translating at least one of the transparent mother sheet and the mechanical scoring device relative to each other, thereby scoring the first surface or the second surface of the transparent mother sheet and forming the damage path.

A thirtieth embodiment includes the method of the twenty-eighth embodiment, wherein forming the score line includes directing an ablation laser onto the first surface or the second surface of the transparent mother sheet to ablate glass material from the first surface of the second surface of the transparent mother sheet and translating at least one of the transparent mother sheet and the ablation laser relative to each other, thereby ablating glass material from the first surface or the second surface of the transparent mother sheet and forming the damage path.

A thirty-first embodiment includes the method of any of the previous embodiments, wherein the transparent mother sheet includes borosilicate glass, soda-lime glass, aluminosilicate glass, alkali aluminosilicate glass, alkaline earth aluminosilicate glass, alkaline earth boro-aluminosilicate glass, fused silica, sapphire, silicon, or gallium arsenide.

A thirty-second embodiment includes the method of any of the previous embodiments, wherein the transparent mother sheet has a thickness of from 50 µm to 2.1 mm, a length of from 200 mm to 2000 mm, and a width of from 100 mm to 1500 mm.

A thirty-third embodiment includes the method of any of the previous embodiments, wherein the transparent mother sheet has a surface area to volume ratio of from 0.5 $mm^{-1}$ to 30 $mm^{-1}$.

A thirty-fourth embodiment includes the method of any of the previous embodiments, wherein the damage path is a first damage path and the transparent mother sheet further includes a second damage path and removing gas from the shell cavity to reduce the cavity pressure in the shell cavity applies stress to the first damage path and the second damage path to separate the transparent mother sheet along the first damage path and the second damage path.

A thirty-fifth embodiment includes the method of the thirty-fourth embodiment, wherein the open ended pressure assembly further includes a membrane skirt removably engageable with the pressure vessel shell, wherein the membrane skirt has an outer edge and a plurality of interior holes, each interior hole comprising a hole perimeter and when contacting the first surface of the transparent mother sheet with the open ended pressure assembly each damage path circumscribes the hole perimeter of an interior hole of the membrane skirt.

A thirty-sixth embodiment includes the method of the thirty-fourth embodiment, wherein a portion of the first damage path and a portion of the second damage path coincide.

A thirty-seventh embodiment includes the method of any of the previous embodiments, wherein the damage path has a break resistance of 20 MPa or less.

A thirty-eighth embodiment includes the method of any of the previous embodiments, wherein the break resistance of the damage path is a directionally homogenous break resistance.

According to a thirty-ninth embodiment, a method of separating a transparent mother sheet includes laser forming a contour of defects in the transparent mother sheet, contacting a first surface of the transparent mother sheet with an open ended pressure assembly having a pressure vessel shell and a membrane skirt, thereby forming a shell cavity defined by the first surface of the transparent mother sheet and the pressure vessel shell, wherein the pressure vessel shell has an outer surface, an inner surface, an end surface, and a fluid removal outlet extending from the outer surface to the inner surface and the membrane skirt is coupled to the end surface of the pressure vessel shell and has a plurality of interior holes. The method further includes removing gas from the shell cavity through the fluid removal outlet to reduce a cavity pressure in the shell cavity, thereby applying stress to the contour of defects to initiate crack propagation along the contour of defects and separate a portion of the transparent mother sheet.

A fortieth embodiment includes the method of the thirty-ninth embodiment, wherein the contour is a closed contour.

A forty-first embodiment includes the method of the thirty-ninth embodiment or the fortieth embodiment, wherein reducing the cavity pressure in the shell cavity flexes the transparent mother sheet thereby applying stress to the contour of defects.

A forty-second embodiment includes the method of any of the thirty-ninth through the forty-first embodiment, wherein laser forming the contour of defects includes directing a pulsed laser beam oriented along a beam pathway and output by a beam source into the transparent mother sheet such that a portion of the pulsed laser beam directed into the transparent mother sheet is a pulsed laser beam focal line and generates an induced absorption within the transparent mother sheet, the induced absorption producing a defect within the transparent mother sheet and translating at least one of the transparent mother sheet and the pulsed laser beam relative to each other along a contour line, thereby laser forming defects along the contour line within the transparent mother sheet.

The forty-third embodiment includes the method of the forty-second embodiment, wherein the pulsed laser beam focal line includes a wavelength λ, a spot size $w_o$, and a Rayleigh range $Z_R$ that is greater than $$F_D \frac{\pi w_0^2}{\lambda},$$

where $F_D$ is a dimensionless divergence factor comprising a value of 10 or greater.

A forty-fourth embodiment includes the method of any of the thirty-ninth through the forty-third embodiments, wherein crack propagation along the contour of defects initiates at multiple locations along the contour of defects.

A forty-fifth embodiment includes the method of any of the thirty-ninth through the forty-forth embodiments, wherein the transparent mother sheet separates along the contour of defects in a separation time comprising less than 1 second.

A forty-sixth embodiment includes the method of any of the thirty-ninth through the forty-fifth embodiments, wherein the contour has a break resistance of 20 MPa or less.

A forty-seventh embodiment includes the method of the forty-sixth embodiment, wherein the break resistance of the contour is a directionally homogenous break resistance.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1A:
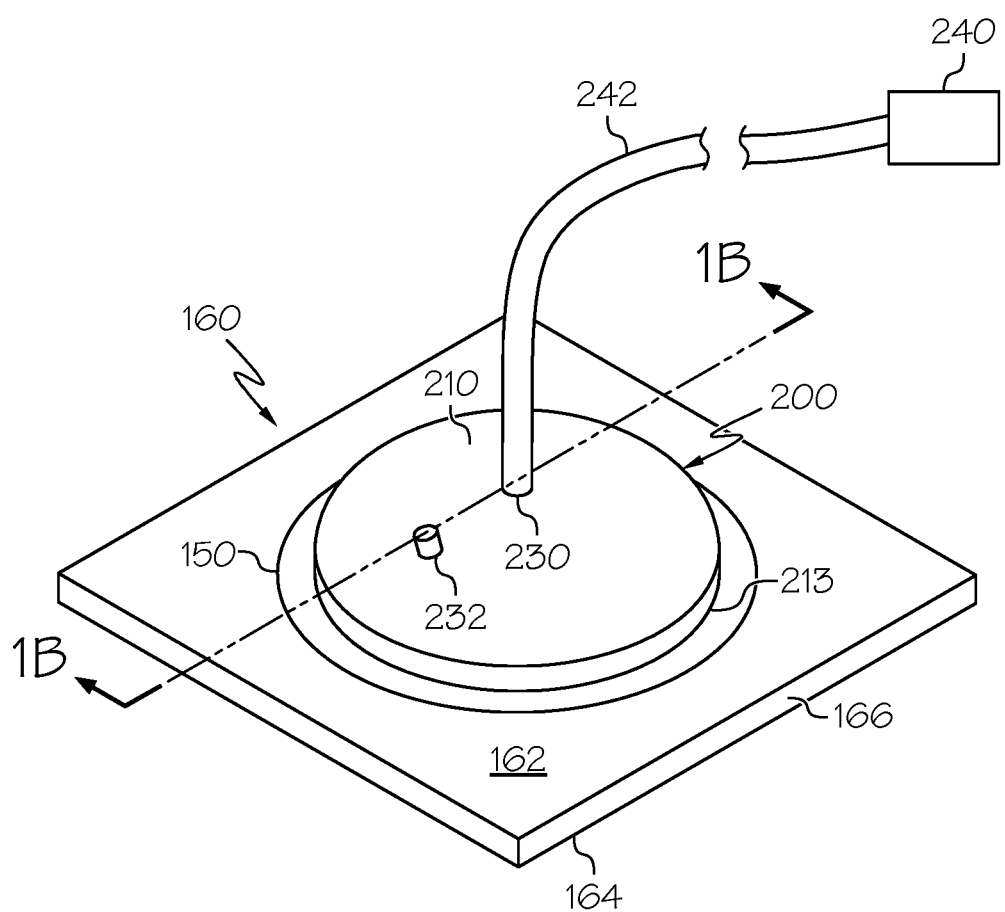
FIG. 1A schematically depicts a transparent mother sheet having a damage path formed therein and an open ended pressure assembly having a pressure vessel shell, according to one or more embodiments described herein.

Reference will now be made in detail to embodiments of processes for separating a transparent article from a transparent mother sheet using an open ended pressure assembly, examples of which are illustrated in the accompanying drawings. Whenever possible, the same reference numerals will be used throughout the drawings to refer to the same or like parts. The transparent mother sheet includes a damage path, such as a closed damage path, which defines a desired perimeter of the transparent article. The damage path may comprise a score line (e.g., a mechanically formed or laser formed score line) or a contour comprising a series of laser formed defects. Separating the transparent article, such as a vehicle windshield, from the transparent mother sheet includes contacting a first surface of the transparent mother sheet with the open ended pressure assembly to form a shell cavity between the first surface of the transparent mother sheet and a pressure vessel shell of the open ended shell assembly. Next, gas is removed the shell cavity using a pressure source to reduce the pressure in the shell cavity. This pressure reduction applies stress, such as multi-axial flexural stress to the transparent mother sheet and the damage path. The applied stress initiates crack propagation along the damage path to separate the transparent article from the transparent mother sheet.

Using the open ended pressure assembly to initiate crack propagation along a damage path formed in a transparent mother sheet facilitates fast and efficient separation of one or more transparent articles from the transparent mother sheet. When compared to previous separation methods, such as infrared laser radiation, use of the open ended pressure assembly reduces the cost (e.g., the tooling cost) of separating the transparent mother sheet without reducing the edge strength and overall quality of the transparent article separated from the transparent mother sheet. Further, the transparent article may be separated from the transparent mother sheet using the open ended pressure assembly faster than previous separation methods, for example, 1.8 times faster than infrared laser radiation separation methods. The open ended pressure assembly eliminates the need for lead in lines to connect the damage path with an edge of the transparent mother sheet, which reduces process time by 20%. The open ended pressure assembly also eliminates the need for a gantry dedicated to an infrared laser system. Thus, in embodiments in which the damage path is laser formed, the gantry previously dedicated to an infrared laser system, may be used for a second laser system dedicated to forming the damage path, which may further reduce process time. For example, the transparent article may be separated from the transparent mother sheet using the open ended pressure assembly and two laser systems for forming the damage path, each coupled to their own gantry, 3.6 times faster than infrared laser radiation separation methods with a single laser system dedicated to forming the damage path. Various embodiments of forming and processing transparent articles from a transparent mother sheet using the open ended pressure assembly will be described herein with specific reference to the appended drawings.

The phrase "transparent mother sheet," as used herein, refers to a glass or glass-ceramic sheet which is transparent, and from which one or more transparent articles may be separated. The term "transparent," as used herein, means that the material has an optical absorption of less than about 20% per mm of material depth, such as less than about 10% per mm of material depth for the specified pulsed laser wavelength, or such as less than about 1% per mm of material depth for the specified pulsed laser wavelength. According to one or more embodiments, the transparent mother sheet may have a thickness of from 30 microns (µm) to 10 mm, such as from 50 µm to 5 mm, from 50 µm to 2.5 mm, from 50 µm to 2.1 mm from 50 µm to 500 µm, from 50 µm to 70 µm, from 100 µm to 5 mm, from 0.5 mm to 3 mm, or from 100 µm to 2 mm, for example, 100 µm, 250 µm, 300 µm, 500 µm, 700 µm, 1 mm, 1.2 mm, 1.5 mm, 2 mm, 5 mm, 7 mm, or any range having any two of these values as endpoints, or any open-ended range having any of these values as a lower bound or an upper bound. In some embodiments, the transparent mother sheet may have a width of from 100 mm to 2000 mm, such as from 100 mm to 1500 mm, from 100 mm to 1000 mm, from 200 mm to 1500 mm, from 200 mm to 1000 mm, for example, 200 mm, 250 mm, 500 mm, 750 mm, 10000 mm, 1250 mm, 1500 mm, or any range having any two of these values as endpoints, or any open-ended range having any of these values as a lower bound or an upper bound. In some embodiments, the transparent mother sheet may have a length of from 100 mm to 2500 mm, such as from 200 mm to 2000 mm, from 200 mm to 1500 mm, from 100 mm to 1110 mm, or from 250 to 1000 mm, for example, 100 mm, 200 mm, 250 mm, 500 mm, 750 mm, 1000 mm, 1100 mm, 1250 mm, or any range having any two of these values as endpoints, or any open-ended range having any of these values as a lower bound or an upper bound.

Further, in some embodiments, the transparent mother sheet may have a surface area to volume ratio of from 0.25 $mm^{-1}$ to 40 $mm^{-1}$, such as from 0.5 $mm^{-1}$ to 35 $mm^{-1}$, from 0.5 $mm^{-1}$ to 30 $mm^{-1}$, from 1 $mm^{-1}$ to 40 $mm^{-1}$, or from 3 $mm^{-1}$ to 20 $mm^{-1}$, such as 0.25 $mm^{-1}$ or greater, 0.5 $mm^{-1}$ or greater, 0.75 $mm^{-1}$ or greater, 1 $mm^{-1}$ or greater, 2 $mm^{-1}$ or greater, 3 $mm^{-1}$ or greater, 5 $mm^{-1}$ or greater, 10 $mm^{-1}$ or greater, or any range having any two of these values as endpoints, or any open-ended range having any of these values as a lower bound. Moreover, in the embodiments described herein, the transparent mother sheet may be separated into one or more transparent articles and a trim portion. The trim portion refers to the remaining portion of transparent mother sheet from which the transparent article(s) are separated (e.g., a contiguous remaining portion that surrounds the transparent article(s)).

Transparent mother sheets may comprise glass sheets formed from glass compositions, such as borosilicate glass, soda-lime glass, aluminosilicate glass, alkali aluminosilicate glass, alkaline earth aluminosilicate glass, alkaline earth boro-aluminosilicate glass, fused silica, or crystalline materials such as sapphire, silicon, gallium arsenide, or combinations thereof. In some embodiments, the glass may be ion-exchangeable, such that the glass composition can undergo ion-exchange for mechanical strengthening. For example, the transparent mother sheet may comprise ion exchanged or ion exchangeable glass, such as Corning Gorilla® Glass (e.g., code 2318, code 2319, and code 2320), EAGLE XG®, and CORNING LOTUS™ available from Corning Incorporated of Corning, N.Y. Further, these ion exchanged glasses may have coefficients of thermal expansion (CTE) of from about 6 ppm/° C. to about 10 ppm/° C. In some embodiments, the glass composition of the transparent workpiece may include greater than about 1.0 mol. % boron and/or compounds containing boron, including, without limitation, $B_2O_3$. In another embodiment, the glass compositions from which the transparent workpieces are formed include less than or equal to about 1.0 mol. % of oxides of boron and/or compounds containing boron. Moreover, the transparent workpiece may comprise other components which are transparent to the wavelength of the laser, for example, crystals such as sapphire or zinc selenide.

The phrase "contour line," as used herein, denotes a line of intended separation on a surface of a transparent mother sheet along which the transparent mother sheet will be separated into a transparent article upon exposure to the appropriate processing conditions. The contour line defines some or all of a desired perimeter of the transparent article, which may be separated from the transparent mother sheet. In some embodiments, the contour line is a closed contour line and defines the entire desired perimeter of the transparent article. In some embodiments, the contour line is not closed, and instead extends between two locations along the edge of the transparent workpiece, such that the contour line defines one portion of the desired perimeter of the transparent article, and the edge of the transparent mother sheet defines another portion of the desired perimeter of the transparent article.

The phrase, "damage path," as used herein, refers to a pathway of damage in the transparent mother sheet formed along the closed contour line which, when separated, defines the some or all of the perimeter of the transparent article. In some embodiments, the damage path is a closed damage path formed along a closed contour line and when separated, defines the entire perimeter of the transparent article. In some embodiments, the damage path is not closed, and instead follows the contour line between two locations along the edge of the transparent workpiece, such that, when separated, the damage path defines one portion of the perimeter of the transparent article, and the edge of the transparent mother sheet defines another portion of the perimeter of the transparent article. The damage path may be a score line, a contour of defects, or the like.

Moreover, a "contour" as used herein, refers to a plurality of defects introduced into the transparent mother sheet using various techniques along the contour line. The contour is a "closed contour" when formed along a closed contour line. Moreover, as used herein, a "defect" may include an area of modified material (relative to the bulk material), void space, scratch, flaw, hole, or other deformities in the transparent mother sheet which enables separation of material of the transparent mother sheet along the contour to form a transparent article from the transparent mother sheet by additional processing, such as stress applied using the open ended pressure assembly. The defects may penetrate the full depth or a portion of the depth of the transparent mother sheet.

A distinction may be made between contours formed by a quasi-non-diffracting beam, and contours formed by scoring or laser ablation. Contours formed by a quasi-non-diffracting beam typically result primarily in a contour of defects within the mother sheet that are not exposed to the external environment, and are not the result of removing material, although there may be minor outright removal of material at the surfaces. Contours formed by scoring or laser ablation typically result primarily in outright removal of material from a surface of the transparent mother sheet, or the creation of a modified surface region (e.g., a region of roughness), although the stress caused by such removal or modification may also result in interior defects such as cracks extending beyond where the material was removed. The type of contour may be readily ascertained by examination.

Figure 1B:
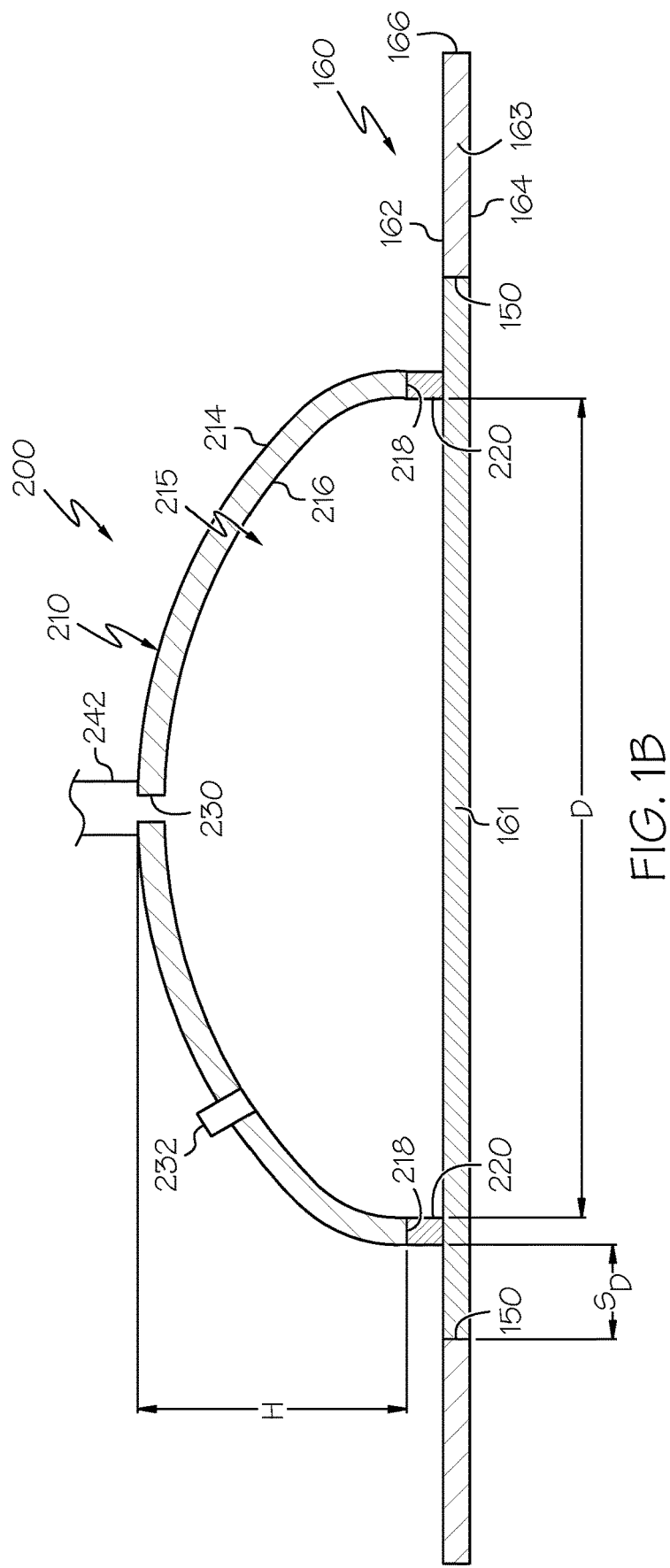
FIG. 1B is a cross sectional view of the transparent mother sheet and the open ended pressure assembly along line 1B-1B of FIG. 1A, according to one or more embodiments shown and described herein.

Referring now to FIGS. 1A and 1, an open ended pressure assembly 200 having a pressure vessel shell 210 is depicted in contact with a first surface 162 of a transparent mother sheet 160, thereby defining a shell cavity 215 between the first surface 162 and the pressure vessel shell 210. The transparent mother sheet 160 comprises a first surface 162, a second surface 164 opposite the first surface 162, an edge 166, and a damage path 150 formed in the transparent mother sheet 160, which provides a path along which a transparent article 161, such as a vehicle windshield, may be separated from the transparent mother sheet 160. The damage path 150 is a closed damage path in the embodiments depicted in FIGS. 1A and 1, however, it should be understood that other damage paths, such as those extending between two locations along the edge 166 of the transparent mother sheet 160 are contemplated. As described in more detail below, the damage path 150 may be a contour 170 of defects 172 formed by a pulsed laser beam 112 (FIGS. 5A-7B) in the interior of the mother sheet or a score line 180 formed by an ablation laser 300 (FIG. 8) or a mechanical scoring device 310 (FIG. 9).

The pressure vessel shell 210 of the open ended pressure assembly 200 comprises an outer surface 214, an inner surface 216, and an end surface 218. The end surface 218 extends from the inner surface 216 to the outer surface 214 and defines a perimeter 213 of the pressure vessel shell 210. In some embodiments, the pressure vessel shell 210 comprises a rigid material, such as a metal material, a rigid plastic, or the like, and in other embodiments, the pressure vessel shell 210 comprises a flexible material, such as a polymer material, a flexible plastic, or the like. Example plastics include Polyvinyl chloride (PVC), acrylic, acrylonitrile butadiene styrene (ABS), and nylon. In addition, when the open ended pressure assembly 200 contacts the first surface 162 of the transparent mother sheet 160, the inner surface 216 faces the first surface 162, such that the shell cavity 215 is defined by the first surface 162 of the transparent mother sheet 160 and the inner surface 216 of the pressure vessel shell 210.

Referring still to FIGS. 1A and 1, the pressure vessel shell 210 comprises a height H and a maximum cross sectional dimension D. The maximum cross sectional dimension D may be larger than the height H, for example, 2 to 10 times larger than the height H. In the embodiment depicted in FIGS. 1A and 1, the perimeter 213 of the pressure vessel shell 210 is circular such that the maximum cross-sectional dimension D is the diameter of the perimeter 213. However, it should be understood that the perimeter 213 of the pressure vessel shell 210 may comprise a variety of shapes and may comprise the same shape (e.g., the same closed shape) as the damage path 150 and a different maximum cross sectional dimension D than the damage path 150. Indeed, a single pressure vessel shell 210 having a fixed shape may be used to separate damage paths 150 having a variety of shapes.

The open ended pressure assembly 200 further comprises a fluid removal outlet 230 extending through the pressure vessel shell 210 from the outer surface 214 to the inner surface 216. The fluid removal outlet 230 may be used to fluidly couple the shell cavity 215 with a pressure source 240, which can be used to remove gas from the shell cavity 215. For example, the fluid removal outlet 230 may be fluidly coupled to the pressure source 240 by a fluid pipe 242. As described in more detail below, removing gas from the shell cavity 215 reduces pressure in the shell cavity 215 which applies force to the transparent mother sheet 160 (and the damage path 150 disposed therein), which may cause separation of the transparent mother sheet 160 along the damage path 150. Further, the pressure reduction in the shell cavity 215 may flex the transparent mother sheet 160. This flexure applies force to the damage path 150 to separate the transparent mother sheet 160 along the damage path 150. The open ended pressure assembly 200 may also include a pressure release opening 232 actuatable between an open position and a closed position. In the open position, gas may flow through the pressure release opening 232. In the closed position, gas is prevented from flowing through the pressure release opening 232.

In some embodiments, the open ended pressure assembly 200 includes a perimeter seal 220 engageable with the pressure vessel shell 210, for example, engageable with the end surface 218 of the pressure vessel shell 210. The perimeter seal 220 may comprise one or a combination of a polymer material, a foam material, or any other compressible sealant material. In some embodiments, the perimeter seal 220 is coupled to the end surface 218, for example, using an adhesive. The perimeter seal 220 comprises a thickness of from 0.5 mm to 15 mm, such as, from 1 mm to 10 mm or from 2 mm to 8 mm, for example, 1 mm, 2 mm, 4 mm, 5 mm, 6 mm, 8 mm, 10 mm, 12 mm, 14 mm, or any range having any two of these values as endpoints, or any open-ended range having any of these values as a lower bound. In operation, the perimeter seal 220 helps to retain a seal between the pressure vessel shell 210 and the first surface 162 of the transparent mother sheet 160 to maintain pressure reduction in the shell cavity 215 when gas is removed from the shell cavity 215.

The perimeter seal 220 may be particularly advantageous when the pressure vessel shell 210 comprises a rigid material, such as metal, as flexure of the transparent mother sheet 160 during gas removal may cause a gap to form between the end surface 218 of a rigid pressure vessel shell 210 and the transparent mother sheet 160. Further, increasing the thickness of the perimeter seal 220 helps retain a seal between the transparent mother sheet 160 and the open ended pressure assembly 200 when the flexure of the transparent mother sheet 160 is increased, for example, due to increased pressure reduction in the shell cavity 215. In embodiments comprising the perimeter seal 220, the perimeter seal 220 contacts the transparent mother sheet 160 when the open ended pressure assembly 200 is placed in contact with the transparent mother sheet 160. In embodiments that do not comprise the perimeter seal 220, such as embodiments in which the pressure vessel shell 210 comprises a flexible material, the end surface 218 of the pressure vessel shell 210 may contact the transparent mother sheet 160 when the open ended pressure assembly 200 is placed in contact with the transparent mother sheet 160.

Figure 2A:
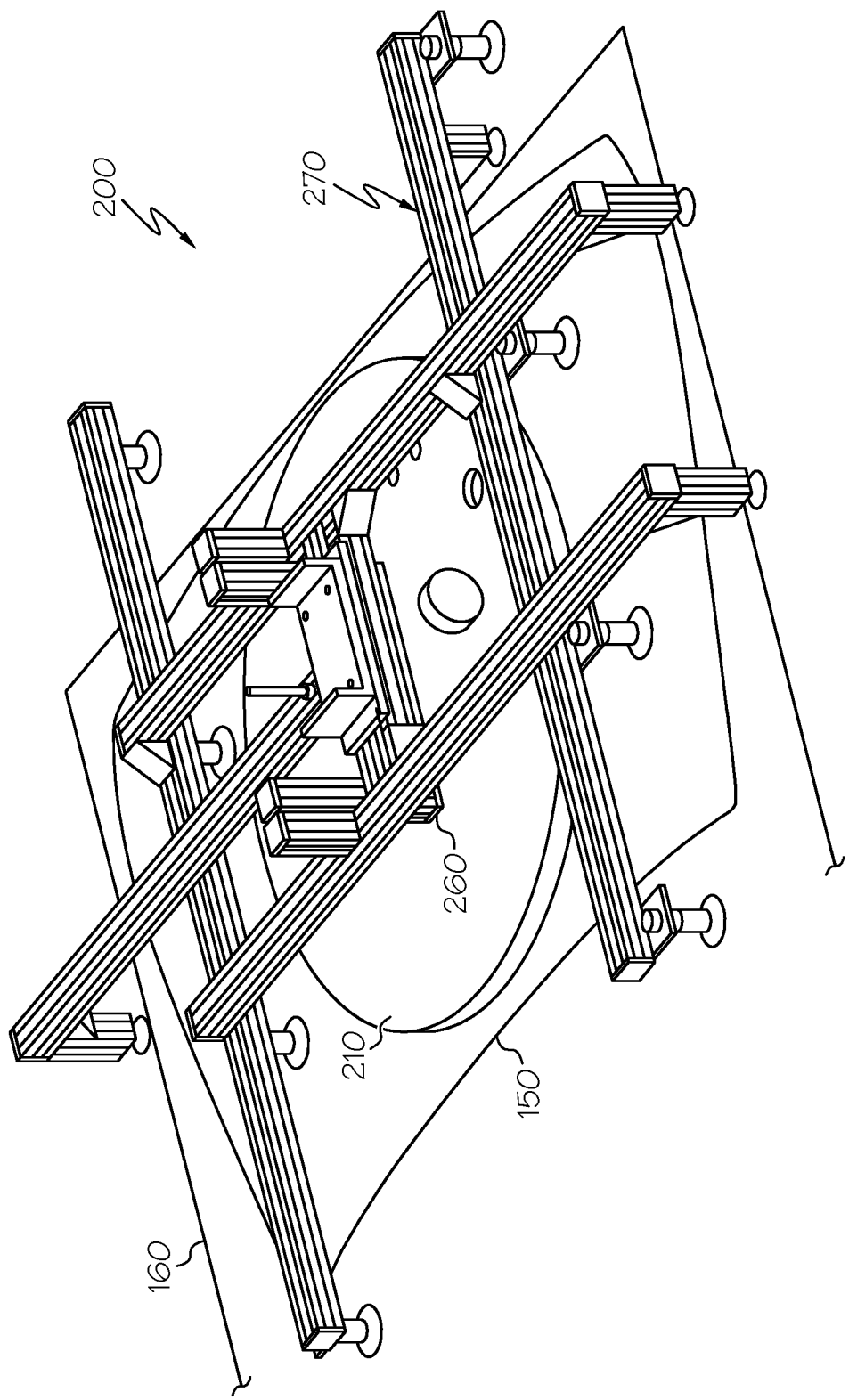
FIG. 2A is an isometric view of an open ended pressure assembly having a pressure vessel shell and a gantry, according to one or more embodiments described herein.
Figure 2B:
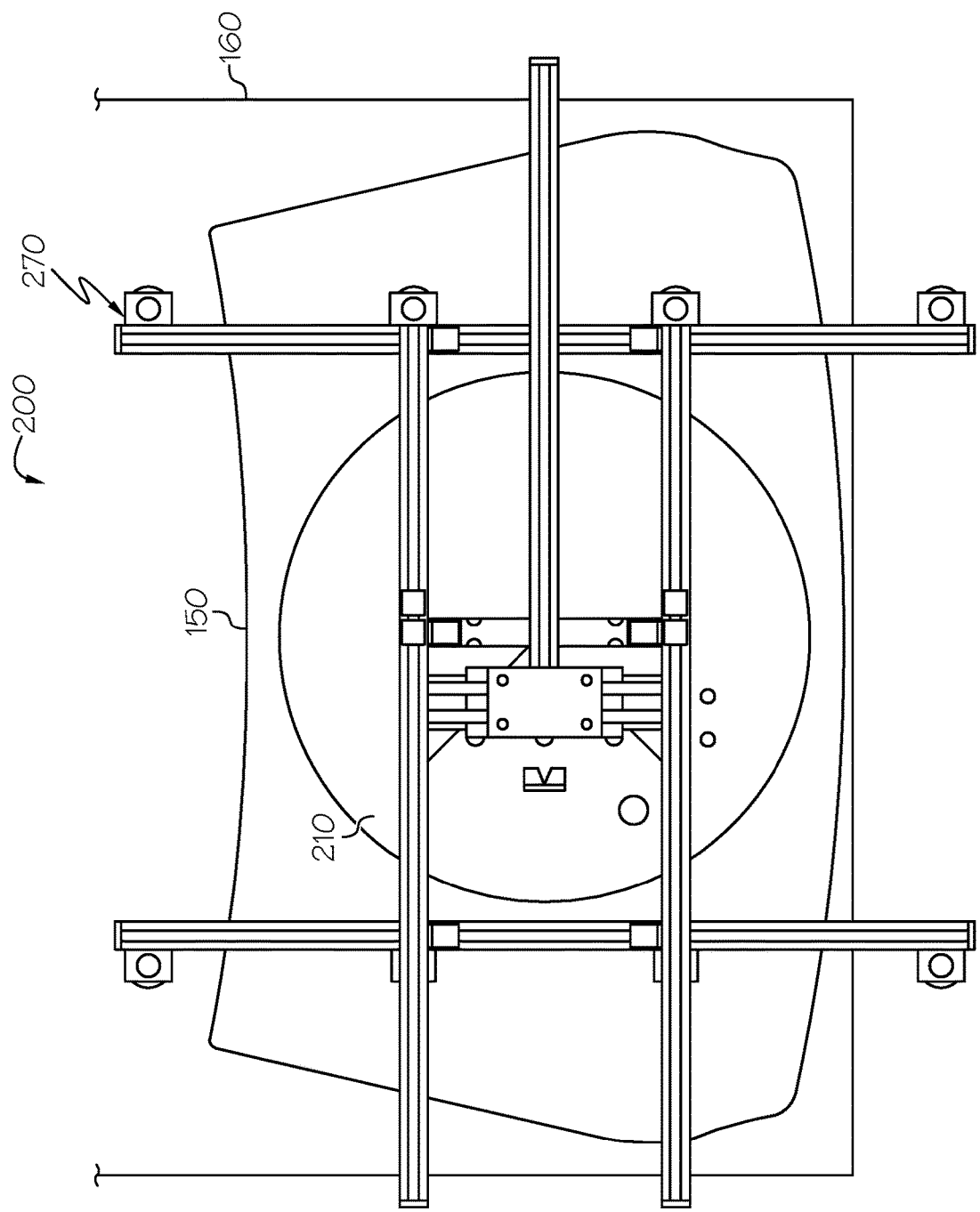
FIG. 2B is a top view of the open ended pressure assembly of FIG. 2A, according to one or more embodiments described herein.

Referring now to FIGS. 2A and 2B, the open ended pressure assembly 200 may further comprise a manipulator arm 260 having a first end coupled to the pressure vessel shell 210 and a second end coupled to a gantry 270. FIG. 2A is an isometric view of the open ended pressure assembly 200 including the manipulator arm 260 and the gantry 270 and FIG. 2B is a top view of FIG. 2A. In some embodiments, the manipulator arm 260 and the gantry 270 are a hand counter balance manipulator system. In other embodiments, the manipulator arm 260 and the gantry 270 is a multi-axis robotic system that can control the vertical and horizontal movements (e.g., movements along the X, Y, and Z axes) of the manipulator arm 260 (and the pressure vessel shell 210 coupled thereto) and further control the tip and tilt of the manipulator arm 260 (and the pressure vessel shell 210 coupled thereto). Further, the gantry 270 and manipulator arm 260 may be used to precisely lift and transport the transparent article 161 from a remaining trim portion 163 of the transparent mother sheet 160 after separation, while minimizing and/or preventing contact between the transparent article 161 and the trim portion 163, minimizing damage to the edges of the transparent article 161.

Referring now to FIGS. 1A-2B, the open ended pressure assembly 200 may be used to separate the transparent mother sheet 160 along the damage path 150 to form the transparent article 161 from the transparent mother sheet 160. In particular, separating the transparent mother sheet 160 using the open ended pressure assembly 200 comprises contacting the first surface 162 of the transparent mother sheet 160 with the perimeter seal 220 of the open ended pressure assembly 200 or in embodiments without the perimeter seal 220, the end surface 218 of the pressure vessel shell 210. Next the method comprises removing gas from the shell cavity 215 through the fluid removal outlet 230. The pressure source 240 may generate fluid flow from the shell cavity 215 to the pressure source 240 through the fluid pipe 242, to remove gas from the shell cavity 215. The pressure source 240 may generate fluid flow at a flow rate of from 0.5 to 100 cubic feet per minute (CFM), such as, 0.5 to 75 CFM, 0.5 to 50 CFM, or 10 to 100 CFM, for example, 0.5 CFM, 1 CFM, 5 CFM, 10 CFM, 25 CFM, 50 CFM, 75 CFM, 100 CFM, or any range having any two of these values as endpoints, or any open-ended range having any of these values as a lower bound. When removing gas from the shell cavity 215, the cavity pressure reaches a minimum pressure of 0.05" Hg to 1.5' Hg, such as 0.1" Hg to 1" Hg or 0.5" Hg to 1" Hg, for example, 0.1" Hg, 0.2" Hg, 0.3" Hg, 0.4" Hg, 0.5" Hg, 0.6" Hg, 0.7" Hg, 0.8" Hg, 0.9" Hg, 1" Hg, 1.1" Hg, 1.2" Hg, 1.3" Hg, 1.4" Hg, 1.5" Hg, or any range having any two of these values as endpoints, or any open-ended range having any of these values as a lower bound. In addition, the pressure release opening 232 may be placed in the closed position to retain pressure reduction in the shell cavity 215 and prevent gas from entering the shell cavity 215 through the pressure release opening 232.

Removing gas from the shell cavity 215 reduces cavity pressure in the shell cavity 215 and applies stress to the transparent mother sheet 160, in particular, to the damage path 150 formed in the transparent mother sheet 160. This stress may be shear stress, flexural stress, or both. Reducing the cavity pressure in the shell cavity 215 may flex the transparent mother sheet 160 to apply stress to the damage path 150, for example, multi-axial stress. For example, the transparent mother sheet 160 may be flexed into a parabolic shape, a hemispherical shape (i.e., a partial spherical shape), a combination of shapes (e.g., wrinkles), or other three-dimensional shapes to generate multi-axial stress. In addition, flexing the transparent mother sheet 160 stresses the first surface 162 and the second surface 164 of the transparent mother sheet 160, thereby stressing to the damage path 150 from two sides of the transparent mother sheet 160. Further, while there is no gap between the perimeter seal 220 and the first surface 162 of the transparent mother sheet 160 in the embodiment depicted in FIGS. 1A and 1, stress may still be applied to the transparent mother sheet 160 by the removal of gas from the shell cavity 215 when a gap is present. For example, when fluid flow out of the shell cavity 215 through the fluid removal outlet 230 is greater than fluid flow into the shell cavity 215 through any gaps, pressure in the shell cavity 215 still reduces.

Stress applied to the damage path 150 may form one or more cracks along the damage path 150, initiating crack propagation along the damage path 150. This crack propagation separates the transparent mother sheet 160 along the damage path 150. In addition, crack propagation may initiate from a single location along the damage path 150 or, in embodiments in which the damage path 150 comprises the contour 170 of defects 172 (FIGS. 5A-7), crack propagation may initiate from the multiple locations on the damage path 150 and converge from multiple locations on the damage path 150, providing further reductions in separation time. Indeed, in embodiments in which the damage path 150 comprises the contour 170 of defects 172 (FIGS. 5A-7), separation time may be less than one second regardless of the size of the damage path 150 because crack propagation may initiation from multiple locations.

In some embodiments, as depicted in FIGS. 1A and 1, the damage path 150 is larger than the perimeter 213 of the pressure vessel shell 210 such that, when the perimeter seal 220 or the end surface 218 of the pressure vessel shell 210 contacts the first surface 162 of the transparent mother sheet 160, the damage path 150 circumscribes the pressure vessel shell 210. In this embodiment, the damage path 150 is spaced apart from the pressure vessel shell 210 along the first surface 162 by a spacing distance $S_D$, which may be uniform along the entire damage path 150 (for example, when the perimeter 213 of the pressure vessel shell 210 and the damage path 150 are the same shape) or variable along the damage path 150 (for example, when the perimeter 213 of the pressure vessel shell 210 and the damage path 150 are different shapes). A maximum spacing distance is the longest distance between the damage path 150 and the nearest location on the perimeter 213 of the pressure vessel shell 210 and a minimum spacing distance is the shortest distance between the damage path 150 and the nearest location on the perimeter 213 of the pressure vessel shell 210. In some embodiments, the maximum spacing distance is 5 mm to 100 mm, such as 5 mm to 50 mm, 5 mm to 25 mm, or 10 mm to 25 mm, for example, 5 mm, 10 mm, 15 mm, 25 mm, 50 mm, 75 mm, or any range having any two of these values as endpoints, or any open-ended range having any of these values as a lower bound. Further, the maximum spacing distance may be dependent on the maximum cross sectional dimension D of the damage path 150. For example, the maximum spacing distance may be 5% to 20% the maximum cross sectional dimension D, for example, 5% to 15% or 5% to 10%, such as 5%, 8%, 10%, 12%, 15%, 18%, 20%, or any range having any two of these values as endpoints, or any open-ended range having any of these values as a lower bound. Furthermore, the location at which the crack propagation initiates may be influenced by the positioning the pressure vessel shell 210. For example, when the pressure vessel shell 210 is positioned such that the spacing distance $S_D$ between the perimeter 213 of the pressure vessel shell 210 and the damage path 150 is variable, the location along the damage path 150 that is nearest the perimeter 213 of the pressure vessel shell 210 will most likely be the location at which crack propagation initiates.

Furthermore, reducing the cavity pressure in the shell cavity 215 may engage the pressure vessel shell 210 with the transparent mother sheet 160. After crack propagation along the damage path 150 separates the transparent article 161 from the transparent mother sheet 160, reduction in cavity pressure may be maintained to retain engagement between the transparent article 161 and the pressure vessel shell 210. For example, the cavity pressure in the shell cavity 215 may be below a pressure outside the shell cavity 215, i.e., the pressure of the room in which the open ended pressure assembly 200 is operating. For example, in the embodiment depicted in FIGS. 1A and 1B in which the damage path 150 circumscribes the pressure vessel shell 210, after separation, the transparent article 161 remains in contact with and engaged with perimeter seal 220 or the end surface 218 of the pressure vessel shell 210. After separation, the manipulator arm 260 and the gantry 270 of the open ended pressure assembly 200 may be used to transport the transparent article 161 away from the trim portion 163. When separation of the transparent article 161 from the transparent mother sheet 160 (and any additional processing, such as transport of the transparent article 161) is complete, after separation of the transparent article 161 from the transparent mother sheet 160, the pressure release opening 232 may be placed into the open position to allow gas to enter into shell cavity 215. Moreover, the open ended pressure assembly 200 may be used to engage the transparent mother sheet 160 without inducing separation. For example, cavity pressure in the shell cavity 215 may be reduced to a pressure that engages the pressure vessel shell 210 with the transparent mother sheet 160 without applying enough force to separate any damage paths 150 formed in the transparent mother sheet 160. Thus, the open ended pressure assembly 200 may be used to transport the transparent mother sheet 160 without separating the transparent mother sheet 160.

Figure 3A:
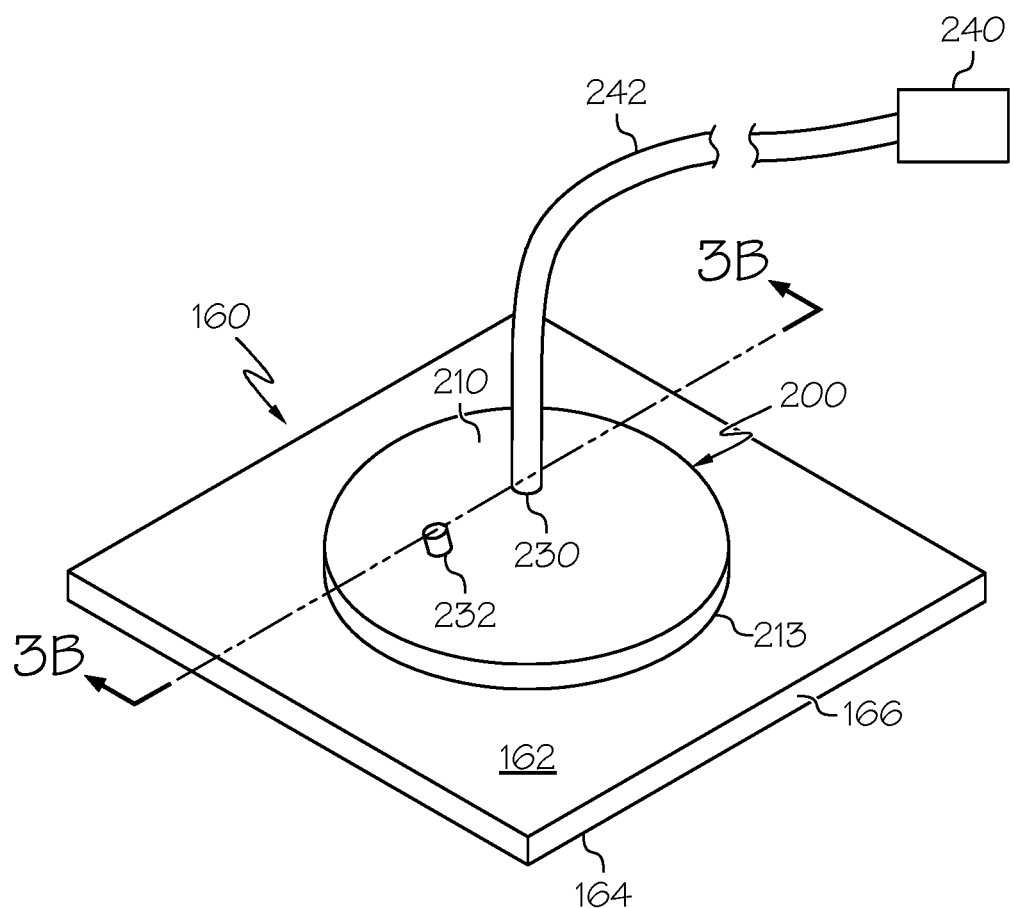
FIG. 3A schematically depicts a transparent mother sheet having a damage path and an open ended pressure assembly having a pressure vessel shell and a membrane skirt, according to one or more embodiments described herein.
Figure 3B:
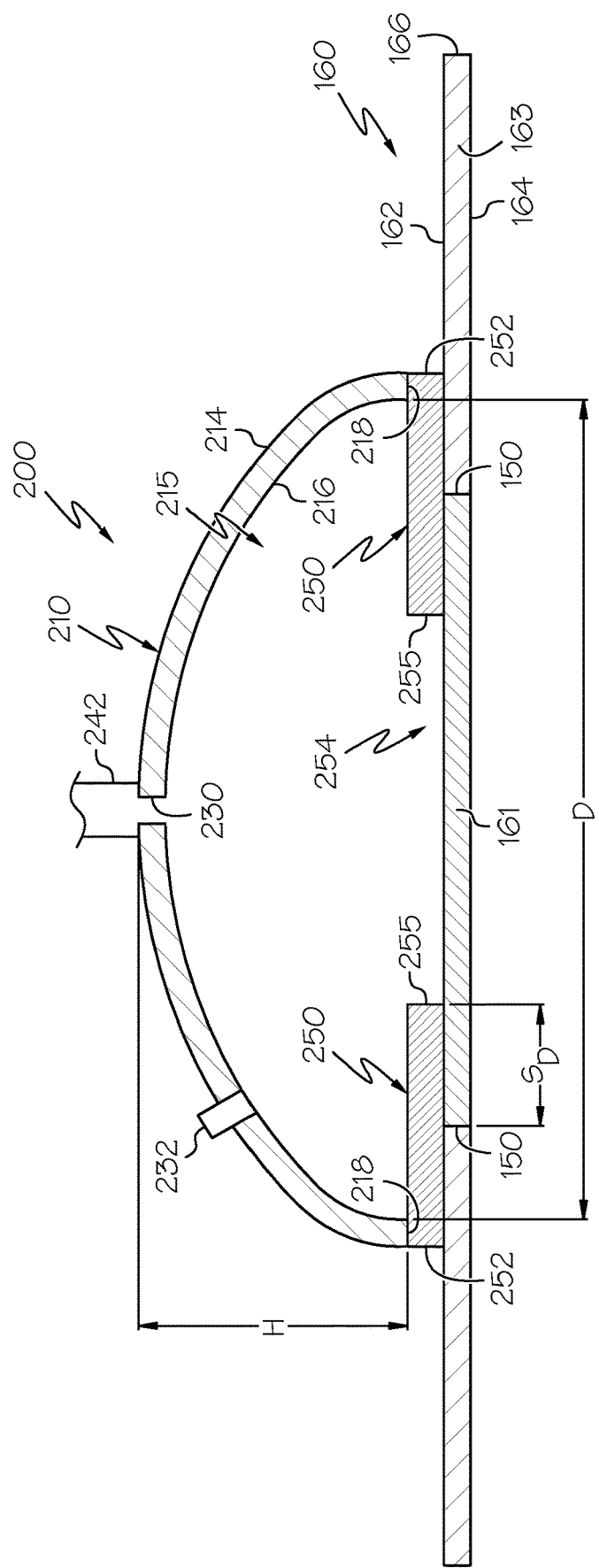
FIG. 3B is a cross sectional view of the transparent mother sheet and the open ended pressure assembly along line 3B-3B of FIG. 3A with one embodiment of the membrane skirt, according to one or more embodiments described herein.
Figure 3C:
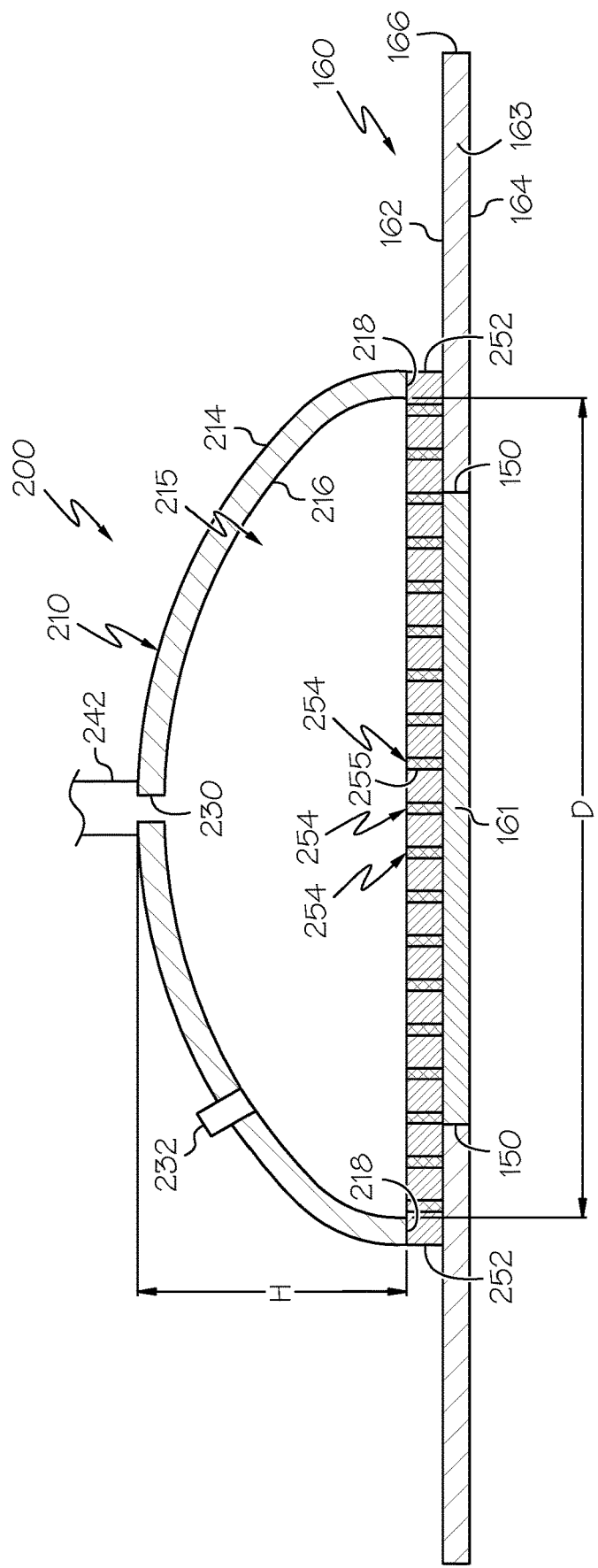
FIG. 3C is a cross sectional view of the transparent mother sheet and the open ended pressure assembly along line 3B-3B of FIG. 3A with another embodiment of the membrane skirt, according to one or more embodiments described herein.

Referring now to FIGS. 3A-3C, in some embodiments, the pressure vessel shell 210 circumscribes the damage path 150 such that, after separation, the pressure vessel shell 210 does not retain contact with the transparent article 161. In this embodiment, the open ended pressure assembly 200 may further comprise a membrane skirt 250, which is removably engageable with the pressure vessel shell 210. The membrane skirt 250 may be coupled to the end surface 218 of the pressure vessel shell 210, for example, using an adhesive. In some embodiments, the membrane skirt 250 may be disposed between the end surface 218 and the perimeter seal 220 and coupled to each, for example, using an adhesive. In other embodiments, the membrane skirt 250 may be coupled to the end surface 218 and may replace the perimeter seal 220. In embodiments comprising the membrane skirt 250 and not the perimeter seal 220, the membrane skirt 250 contacts the transparent mother sheet 160 when the open ended pressure assembly 200 is placed in contact with the transparent mother sheet 160. The membrane skirt 250 may comprise foam, plastic, silkscreen, acrylic glass, fiberglass, PVC, acrylic, acrylonitrile butadiene styrene (ABS), nylon, a polymer, such as polycarbonate, or the like. Further, the membrane skirt 250 comprises a thickness of from 0.5 mm to 15 mm, such as, from 1 mm to 10 mm or from 2 mm to 8 mm, for example, 1 mm, 2 mm, 4 mm, 5 mm, 6 mm, 8 mm, 10 mm, 12 mm, 14 mm, or any range having any two of these values as endpoints, or any open-ended range having any of these values as a lower bound.

The membrane skirt 250 comprises an outer edge 252 and one or more interior holes 254, each comprising a hole perimeter 255. The outer edge 252 may be coupled to the pressure vessel shell 210 (e.g., coupled to the end surface 218) or may extend outside of the pressure vessel shell 210. In the embodiment depicted in FIG. 3B, at least one of the one or more interior holes 254 is disposed in the shell cavity 215 and is sized and shaped to correspond with the damage path 150. For example, the hole perimeter 255 may be contained within the damage path 150 such that the membrane skirt 250 covers the damage path 150. Similar to the embodiments described above, the hole perimeter 255 of the interior hole 254 of the membrane skirt 250 may be disposed a spacing distance $S_D$ from the damage path 150, such that, the maximum spacing distance from the hole perimeter 255 to the damage path 150 is less than 100 mm, such as less than 80 mm, less than 60 mm, less than 50 mm, less than 30 mm, less than 20 mm, less than 10 mm, or less than 5 mm, such as 90 mm, 80 mm, 75 mm, 60 mm, 50 mm, 40 mm 25 mm, 15 mm, 10 mm, 5 mm, 1 mm, or any range having any two of these values as endpoints, or any open-ended range having any of these values as a lower bound. Moreover, in the embodiment depicted in FIG. 3C, the one or more interior holes 254 are arranged in an array and may be sized and positioned such that at least one of the interior holes 254 is circumscribed by the damage path 150. In this embodiment, multiple interior holes 254 may be circumscribed by the damage path 150, such that the interior holes 254 may be much smaller than the damage path 150. In addition, the array of interior holes 254 of FIG. 3C allow a single membrane skirt 250 to be used to separate transparent mother sheets 160 having one or more closed damage paths 150 with a variety of shapes and sizes.

Referring again to FIGS. 3B and 3C, when the transparent article 161 is separated from the transparent mother sheet 160, the membrane skirt 250 maintains contact with the transparent article 161. This allows the open ended pressure assembly 200 to transport the transparent article 161 away from the trim portion 163. In addition, the membrane skirt 250 may also reduce the distance along the first surface 162 between the damage path 150 and a portion of the open ended pressure assembly 200.

Figure 4A:
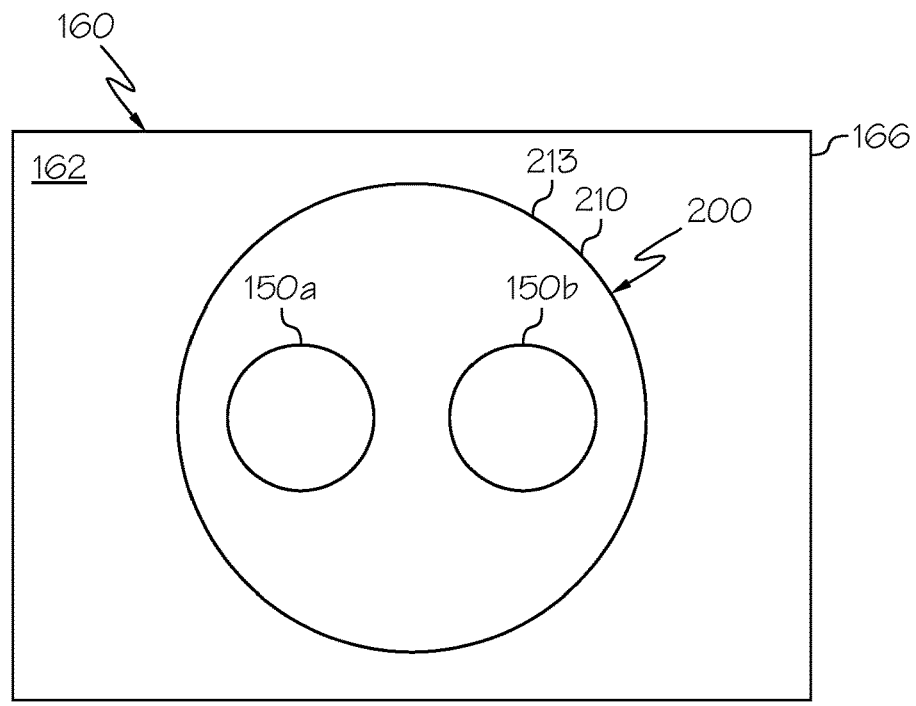
FIG. 4A schematically depicts a transparent mother sheet having multiple damage paths spaced apart from one another and an open ended pressure assembly having a pressure vessel shell and a membrane skirt with multiple interior holes, according to one or more embodiments described herein.
Figure 4B:
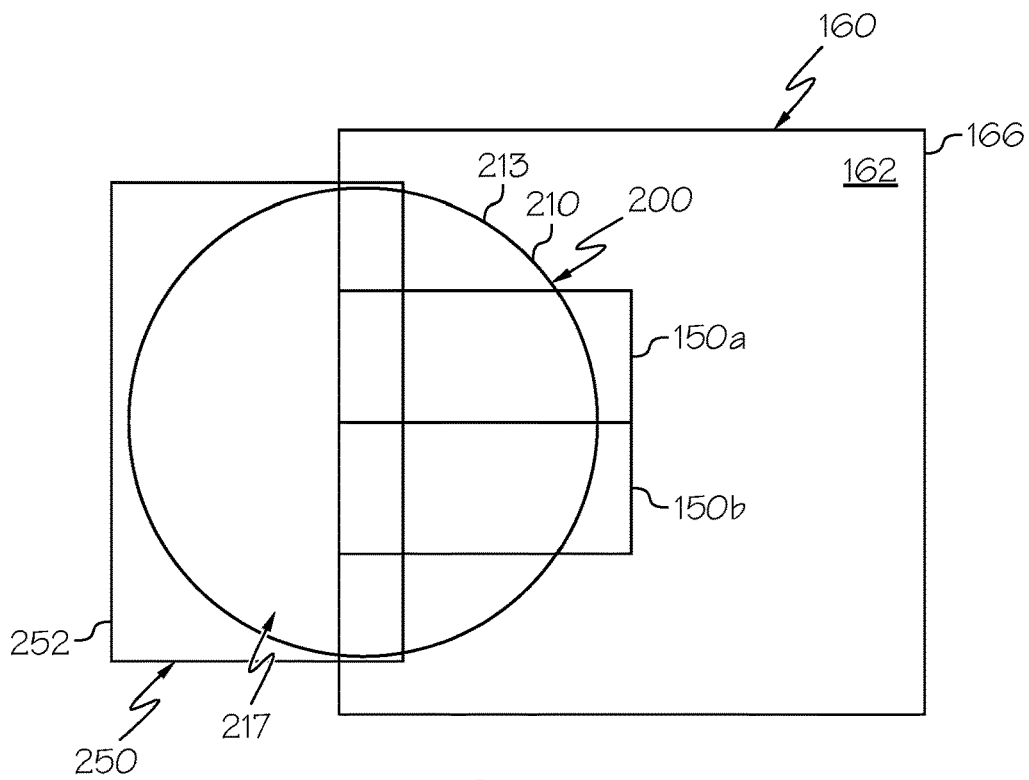
FIG. 4B schematically depicts a transparent mother sheet having multiple damage paths having coinciding portion and an open ended pressure assembly having a pressure vessel shell and a membrane skirt with multiple interior holes, according to one or more embodiments described herein.

Referring now to FIGS. 4A and 4B, in some embodiments, the transparent mother sheet 160 comprises multiple damage paths 150. FIGS. 4A and 4B each depict a first damage path 150a and a second damage path 150b, however, it should be understood that any number of damage paths 150 are contemplated. Each damage path 150 represents the desired perimeter of a transparent article 161. In the embodiment depicted in FIG. 4A, the first damage path 150a is spaced apart from the second damage path 150b, for example, by a distance of 25 mm or less, such as 15 mm or less, 10 mm or less, 5 mm or less, 1 mm or less, 0.5 mm or less, 0.1 mm or less, such as 20 mm, 10 mm, 7.5 mm, 5 mm, 2.5 mm, 1 mm, 0.5 mm, 0.1 mm, or any range having any two of these values as endpoints, or any open-ended range having any of these values as a lower bound. Further, in this embodiment, the membrane skirt 250 may comprise multiple interior holes 254, such that each damage path 150 circumscribes an interior hole 254, facilitating separation of each damage path 150 into a transparent article 161 and facilitating post-separation engagement with the membrane skirt 250 such that the transparent articles 161 may be transported by the open ended pressure assembly 200.

Referring now to FIG. 4B, in some embodiments, adjacent damage paths 150 may have a shared (i.e., coincident) portion such that there is no gap between the damage paths 150. For example, in FIG. 4B, a portion of the first damage path 150a and a portion of the second damage path 150b coincide. Coincident portions of multiple damage paths 150 may reduce size of the trim portion 163 of the transparent mother sheet 160, maximizing material usage of the transparent mother sheet 160. In addition, the first damage path 150a and the second damage path 150b shown in FIG. 4B are not closed and instead each extend between locations along the edge 166 of the transparent mother sheet 160. Thus, when the transparent mother sheet 160 is separated along the first damage path 150a and the second damage path 150b, portions of the edge 166 form portions of the resultant edge of the transparent articles 161.

As depicted in FIG. 4B, in some embodiments, the transparent mother sheet 160 and the pressure vessel shell 210 may be positioned relative to each other such that a portion of the pressure vessel shell 210 extends beyond the edge 166 of the transparent mother sheet 160 forming an opening 217 in the shell cavity 215. In this embodiment, the membrane skirt 250 may be used to cover the opening 217 in the shell cavity 215. In addition, in some embodiments, as also depicted in FIG. 4B, when contacting the first surface 162 of the transparent mother sheet with the open ended pressure assembly 200, a portion of each damage path 150a, 150b is covered by the pressure vessel shell 210 and a portion of each damage path 150a, 150b is not covered by the pressure vessel shell 210.

Referring now to FIGS. 5A-9, methods and apparatuses for forming the damage path 150 in the transparent mother sheet 160 will now be described. The damage path 150 is formed in the transparent mother sheet before contacting the first surface 162 of the open ended pressure assembly 200 (e.g., the perimeter seal 220, the end surface 218, or the membrane skirt 250). The damage path 150 may extend from the first surface 162 to the second surface 164 of the transparent mother sheet 160, from the first surface 162 into the bulk of the transparent mother sheet 160, or from the second surface 164 into the bulk of the transparent mother sheet 160. In some embodiments, described below with respect to FIGS. 5A-7B, the damage path 150 comprises a contour 170 of defects 172 formed using a pulsed laser beam 112 directed into the transparent mother sheet 160 as a pulsed laser beam focal line 113. In some embodiments, described below with respect to FIGS. 8 and 9, the damage path 150 comprises a score line 350 formed using an ablation laser 300 (FIG. 8) or a mechanical scoring device 310 (FIG. 9).

In each of these embodiments, the damage path 150 comprises a "break resistance," which is the stress (in MPa) under which crack propagation initiates along the damage path 150. When the damage path 150 comprises a low break resistance, less stress is needed to separate the transparent mother sheet 160 along the damage path 150 and by applying less stress, unintended cracking and chipping may be minimized. In contrast, when the damage path 150 comprises a high break resistance, more stress is needed to separate the transparent mother sheet 160 along the damage path 150 and applying too much stress may cause uncontrollable cracking (e.g., cracking does not follow the damage path 150), chipping, and separation failure. In the embodiments described herein, the damage path 150 may comprise a break resistance of 30 MPa or less, such, 25 MPa or less, 20 MPa or less, 15 MPa or less, 10 MPa or less, or 5 MPa or less, for example, 30 MPa, 25 MPa, 20 MPa, 18 MPa, 15 MPa, 12 MPa, 10 MPa, 8 MPa, 6 MPa, 5 MPa, or any range having any two of these values as endpoints, or any open-ended range having any of these values as a lower bound.

In addition, while the break resistance of the damage path 150 may vary directionally, for example, the damage path 150 may have a different break resistance in the X-direction than in the Y-direction. However, it is advantageous to minimize this directional variability. Without intending to be limited by theory, when the break resistance varies directionally, more stress may be needed to separate portions of the damage path 150 extending along a surface of the transparent mother sheet 160 in one direction (e.g., an X-direction) than needed to separate portions of the damage path 150 extending in a different direction (e.g., a Y-direction). In this situation, separation of the damage path 150 is more difficult because crack propagation may occur along the portion of the damage path 150 having lower break resistance but not along the portion of the damage path 150 having higher break resistance and in some instances, catastrophic cracking may occur, for example, when the path of least resistance does not coincide with the damage path 150. Thus, in the embodiments described herein, the damage path 150 comprises a directionally homogenous break resistance. As used herein, a "directionally homogenous break resistance" is a break resistance that does not vary by greater than 25% in any direction along the first surface 162 of the transparent mother sheet 160 (e.g., along the X-Y plane).

Figure 5A:
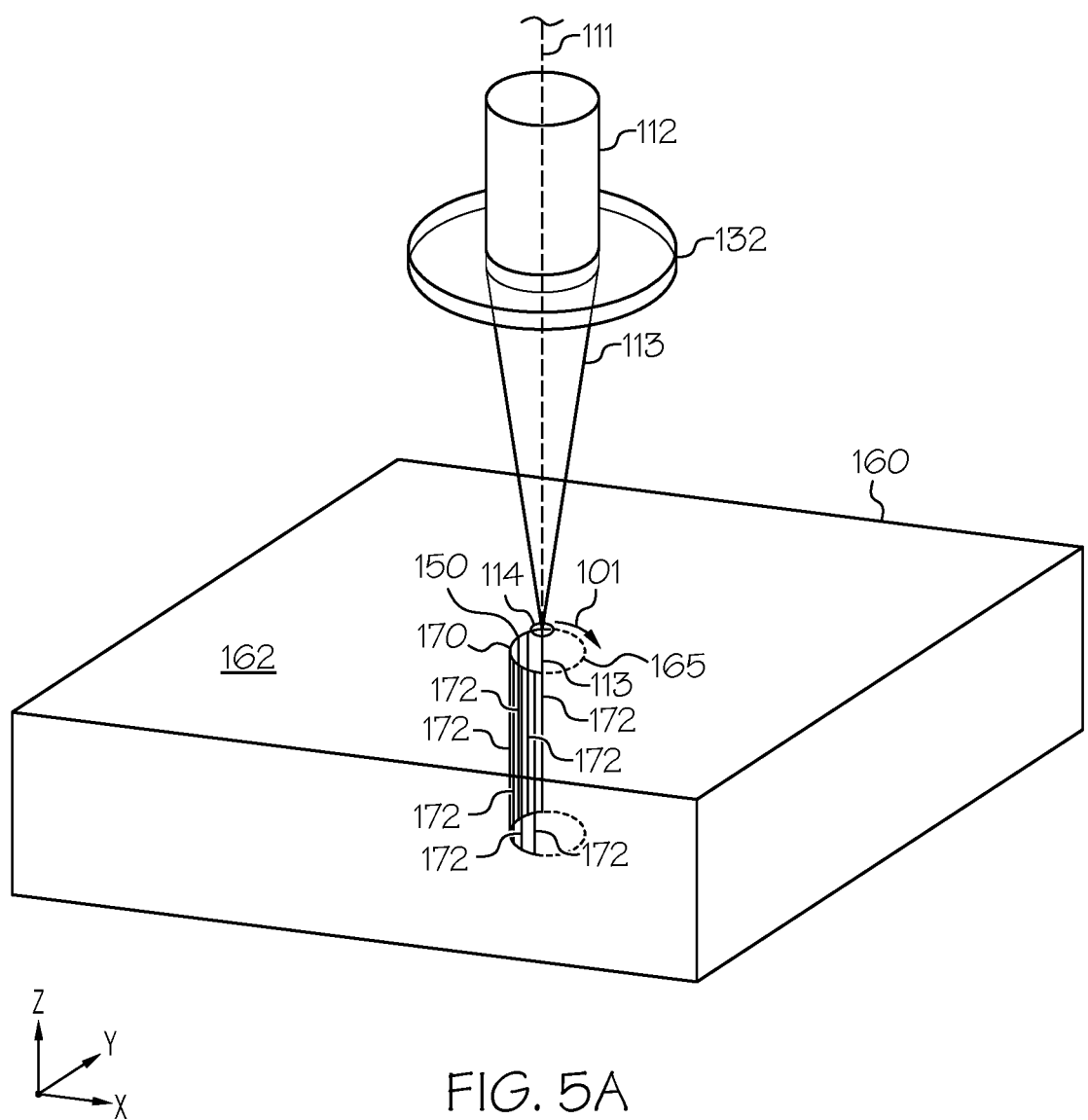
FIG. 5A schematically depicts the formation of a damage path in a transparent mother sheet comprising a contour of defects, according to one or more embodiments described herein.
Figure 5B:
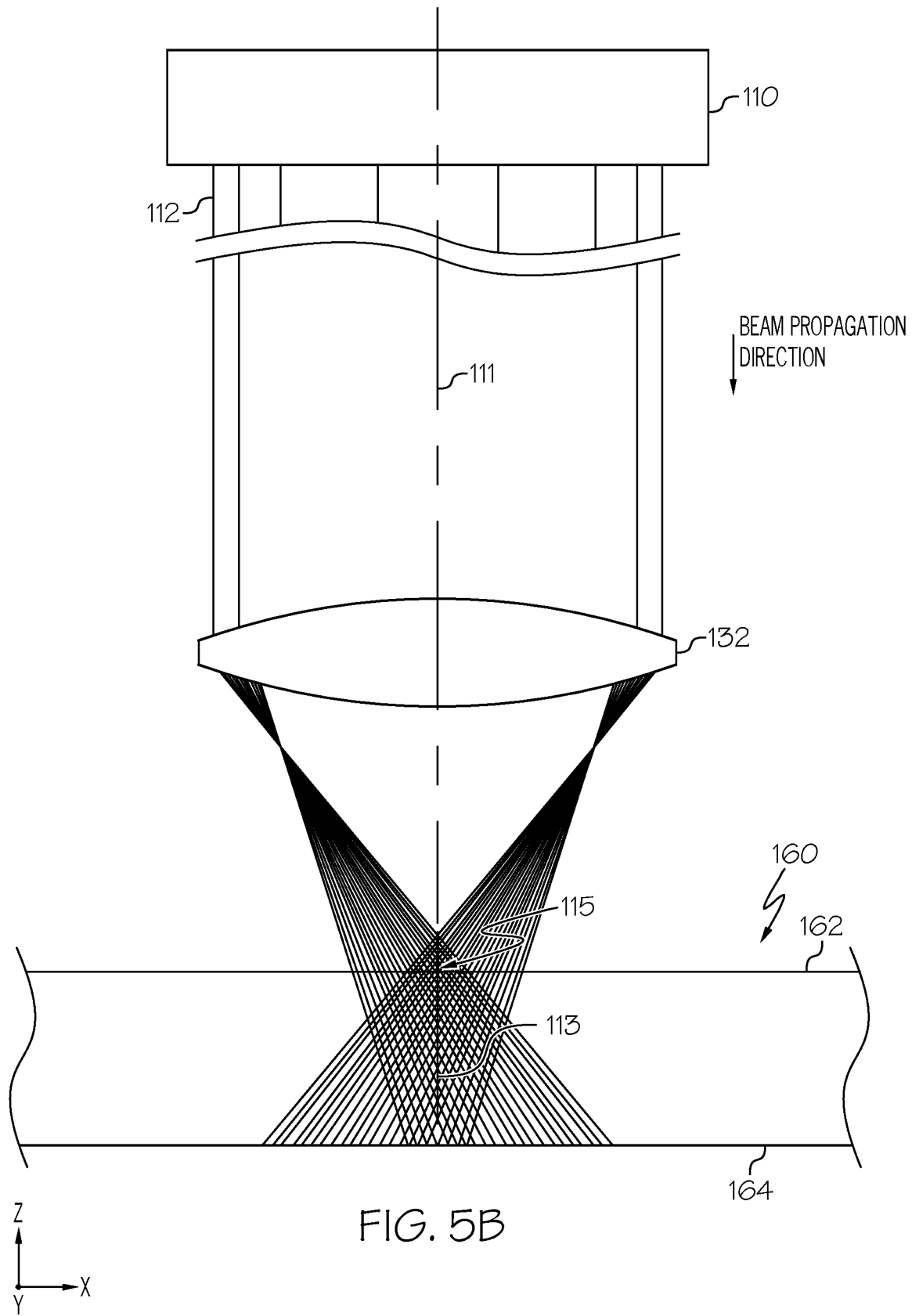
FIG. 5B schematically depicts an example pulsed laser beam focal line during processing of a transparent mother sheet, according to one or more embodiments described herein.

Referring now to FIGS. 5A and 5B the transparent mother sheet 160, is schematically depicted undergoing laser processing to form the damage path 150 comprising the contour 170 of defects 172. The contour 170 may be formed by translating at least one of the pulsed laser beam 112 and the transparent mother sheet 160 relative to one another such that the pulsed laser beam 112 translates relative to the transparent mother sheet 160 in a translation direction 101. FIGS. 5A and 5B depict the pulsed laser beam 112 along a beam pathway 111 and oriented such that the pulsed laser beam 112 may be focused into the pulsed laser beam focal line 113 within the transparent mother sheet 160, for example, using an aspheric optical element 120 (FIG. 6), for example, an axicon and one or more lenses (e.g., a first lens 130 and a second lens 132, as described below and depicted in FIG. 6). For example, the position of the pulsed laser beam focal line 113 may be controlled along the Z-axis and about the Z-axis. Further, the pulsed laser beam focal line 113 may have a length in a range of from 0.1 mm to 100 mm, such as from 0.1 mm to 10 mm, or 0.5 mm to 5 mm, for example, 0.1 mm, 0.2 mm, 0.3 mm, 0.4 mm, 0.5 mm, 0.7 mm, 1 mm, 2 mm, 3 mm, 4 mm, or 5 mm, or any range having any two of these values as endpoints, or any open-ended range having any of these values as a lower bound. Further, the pulsed laser beam focal line 113 may be a portion of a quasi-non-diffracting beam, as defined in more detail below.

FIG. 5A depicts that the pulsed laser beam 112 forms a beam spot 114 projected onto the first surface 162 of the transparent mother sheet 160. While the pulsed laser beam 112 is depicted initially irradiating the transparent mother sheet 160 at the first surface 162 in FIG. 5A, it should be understood that in other embodiments, the pulsed laser beam 112 may instead initially irradiate the transparent mother sheet 160 at the second surface 164. Further, as also used herein "beam spot" refers to a cross section of a laser beam (e.g., the pulsed laser beam 112) at a point of first contact with a transparent workpiece (e.g., the transparent mother sheet 160).

In operation, the contour 170 may be formed by irradiating the contour line 165 with the pulsed laser beam 112 (depicted as the beam spot 114 in FIG. 5A) and translating at least one of the pulsed laser beam 112 and the transparent mother sheet 160 relative to each other along the contour line 165 in the translation direction 101 to form the defects 172 of the contour 170. While the contour 170 is depicted in FIG. 5A as a circle, it should be understood that other configurations (such as closed configurations) are contemplated and possible including, without limitation, rectangles, ellipses, squares, hexagons, ovals, regular geometric shapes, irregular shapes, polygonal shapes, arbitrary shapes, and the like. Further, the embodiments described herein may be used to form multiple closed contours 170 in a single transparent mother sheet 160 and thereby form multiple transparent articles 161 from the transparent mother sheet 160.

Referring still to FIG. 5A, in the embodiments described herein, a pulsed laser beam 112 (with a beam spot 114 projected onto the transparent mother sheet 160) may be directed onto the transparent mother sheet 160 (e.g., condensed into a high aspect ratio line focus that penetrates through at least a portion of the thickness of the transparent mother sheet 160). This forms the pulsed laser beam focal line 113. Further, the beam spot 114 is an example cross section of the pulsed laser beam focal line 113 and when the pulsed laser beam focal line 113 irradiates the transparent mother sheet 160 (forming the beam spot 114), the pulsed laser beam focal line 113 penetrates at least a portion of the transparent mother sheet 160.

Figure 6:
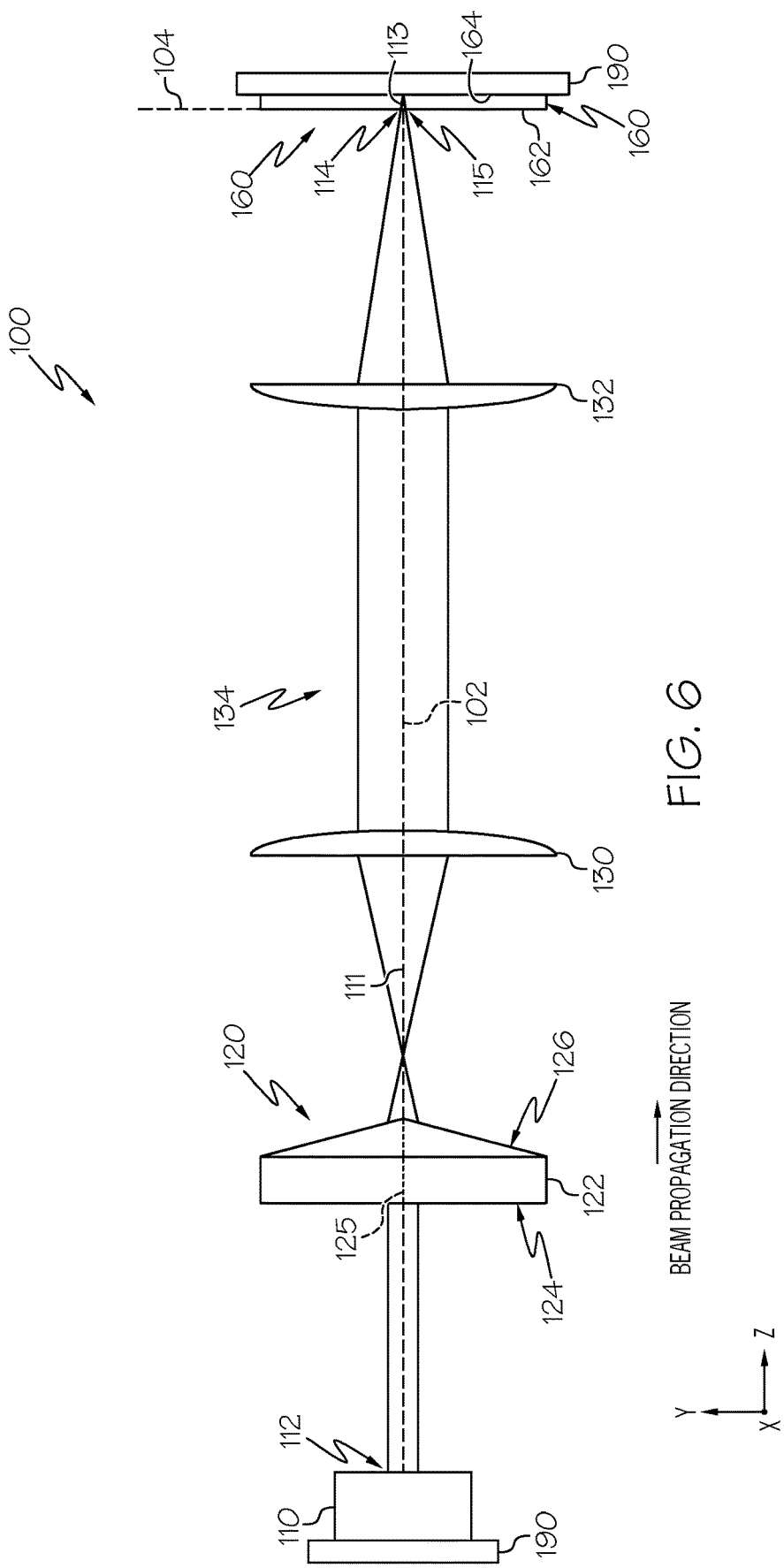
FIG. 6 schematically depicts an optical assembly for pulsed laser processing, according to one or more embodiments described herein.
Figure 7:
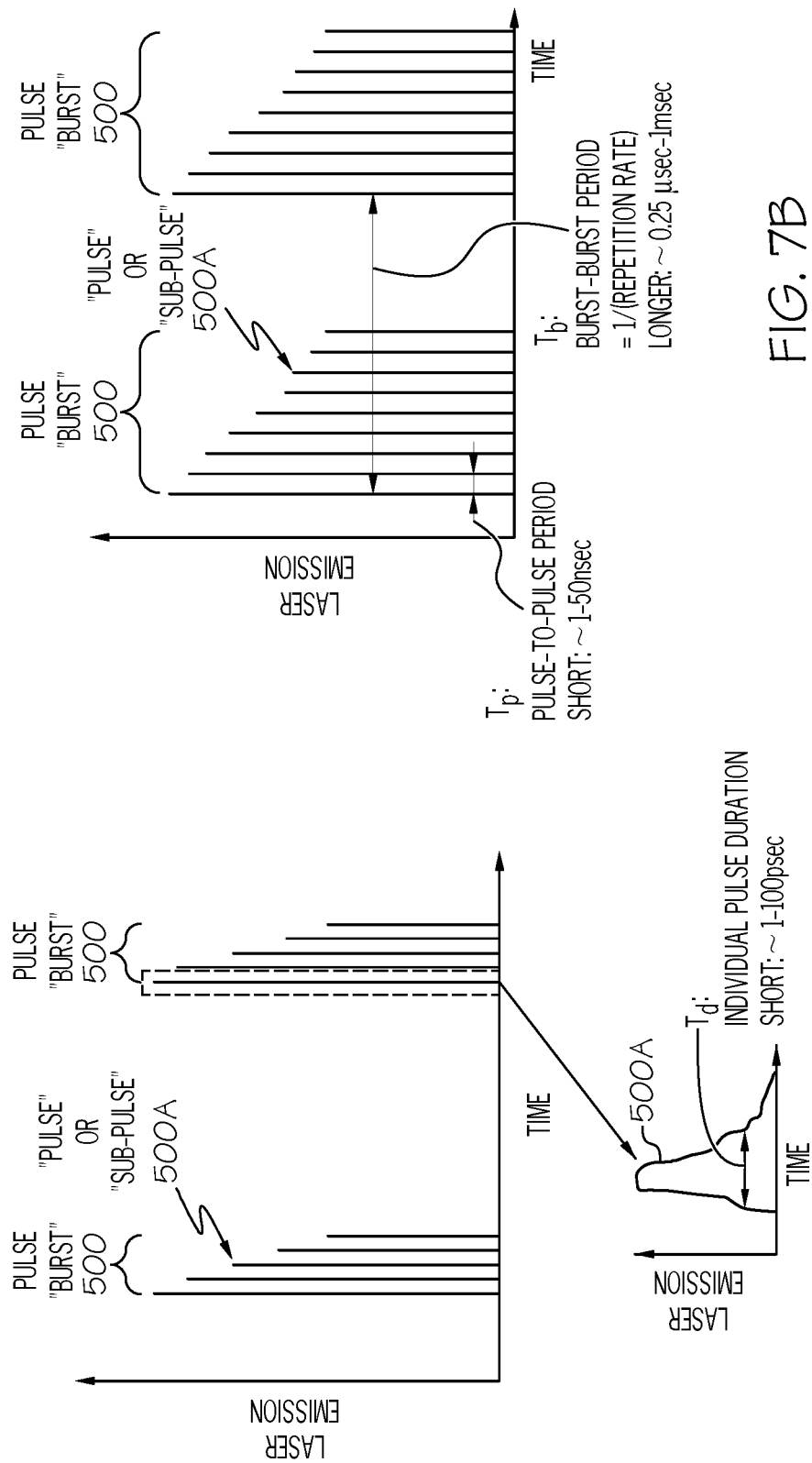
FIG. 7A graphically depicts the relative intensity of laser pulses within an exemplary pulse burst vs. time, according to one or more embodiments described herein, according to one or more embodiments described herein.
FIG. 7B graphically depicts relative intensity of laser pulses vs. time within another exemplary pulse burst, according to one or more embodiments described herein.

Further, the pulsed laser beam 112 may be translated relative to the transparent mother sheet 160 (e.g., in the translation direction 101) to form the plurality of defects 172 of the contour 170. Directing or localizing the pulsed laser beam 112 into the transparent mother sheet 160 generates an induced absorption within the transparent mother sheet 160 and deposits enough energy to break chemical bonds in the transparent mother sheet 160 at spaced locations along the contour line 165 to form the defects 172. According to one or more embodiments, the pulsed laser beam 112 may be translated across the transparent mother sheet 160 by motion of the transparent mother sheet 160 (e.g., motion of a translation stage 190 coupled to the transparent mother sheet 160, as shown in FIG. 6), motion of the pulsed laser beam 112 (e.g., motion of the pulsed laser beam focal line 113), or motion of both the transparent mother sheet 160 and the pulsed laser beam focal line 113. By translating at least one of the pulsed laser beam focal line 113 relative to the transparent mother sheet 160, the plurality of defects 172 may be formed in the transparent mother sheet 160.

In some embodiments, the defects 172 may generally be spaced apart from one another by a distance along the contour 170 of from 0.1 µm to 500 µm, such as, 1 µm to 200 µm, 2 µm to 100 µm, or 5 µm to 20 µm, 0.1 µm to 50 µm, 5 µm to 15 µm, 5 µm to 12 µm, 7 µm to 15 µm, or 7 µm to 12 µm, such as 50 µm or less, 45 µm or less, 40 µm or less, 35 µm or less, 30 µm or less, 25 µm or less, 20 µm or less, 15 µm or less, 10 µm or less, such as 100 µm, 75 µm, 50 µm, 40 µm, 30 µm, 25 µm, 10 µm, 5 µm, or any range having any two of these values as endpoints, or any open-ended range having any of these values as a lower bound. Further, the translation of the transparent mother sheet 160 relative to the pulsed laser beam 112 may be performed by moving the transparent mother sheet 160 and/or the beam source 110 using one or more translation stages 190 (FIG. 6).

Referring again to FIG. 5A, the pulsed laser beam 112 used to form the defects 172 further has an intensity distribution $I(X,Y,Z)$, where Z is the beam propagation direction of the pulsed laser beam 112, and X and Y are directions orthogonal to the direction of propagation, as depicted in the figures. The X-direction and Y-direction may also be referred to as cross-sectional directions and the X-Y plane may be referred to as a cross-sectional plane. The intensity distribution of the pulsed laser beam 112 in a cross-sectional plane may be referred to as a cross-sectional intensity distribution.

The pulsed laser beam 112 at the beam spot 114 or other cross sections may comprise a quasi-non-diffracting beam, for example, a beam having low beam divergence as mathematically defined below, by propagating the pulsed laser beam 112 (e.g., outputting the pulsed laser beam 112, such as a Gaussian beam, using a beam source 110) through an aspheric optical element 120, as described in more detail below with respect to the optical assembly 100 depicted in FIG. 6. Beam divergence refers to the rate of enlargement of the beam cross section in the direction of beam propagation (i.e., the Z direction). As used herein, the phrase "beam cross section" refers to the cross section of the pulsed laser beam 112 along a plane perpendicular to the beam propagation direction of the pulsed laser beam 112, for example, along the X-Y plane. One example beam cross section discussed herein is the beam spot 114 of the pulsed laser beam 112 projected onto the transparent mother sheet 160. Example quasi non-diffracting beams include Gauss-Bessel beams and Bessel beams.

Diffraction is one factor that leads to divergence of pulsed laser beams 112. Other factors include focusing or defocusing caused by the optical systems forming the pulsed laser beams 112 or refraction and scattering at interfaces. Pulsed laser beams 112 for forming the defects 172 of the contour 170 may have beam spots 114 with low divergence and weak diffraction. The divergence of the pulsed laser beam 112 is characterized by the Rayleigh range $Z_R$, which is related to the variance $\sigma^2$ of the intensity distribution and beam propagation factor $M^2$ of the pulsed laser beam 112. In the discussion that follows, formulas will be presented using a Cartesian coordinate system. Corresponding expressions for other coordinate systems are obtainable using mathematical techniques known to those of skill in the art. Additional information on beam divergence can be found in the articles entitled "New Developments in Laser Resonators" by A. E. Siegman in SPIE Symposium Series Vol. 1224, p. 2 (1990) and "$M^2$ factor of Bessel-Gauss beams" by R. Borghi and M. Santarsiero in Optics Letters, Vol. 22(5), 262 (1997), the disclosures of which are incorporated herein by reference in their entirety. Additional information can also be found in the international standards ISO 11146-1:2005(E) entitled "Lasers and laser—related equipment—Test methods for laser beam widths, divergence angles and beam propagation ratios—Part 1: Stigmatic and simple astigmatic beams", ISO 11146-2:2005(E) entitled "Lasers and laser-related equipment—Test methods for laser beam widths, divergence angles and beam propagation ratios—Part 2: General astigmatic beams", and ISO 11146-3:2004(E) entitled "Lasers and laser-related equipment-Test methods for laser beam widths, divergence angles and beam propagation ratios—Part 3: Intrinsic and geometrical laser beam classification, propagation and details of test methods", the disclosures of which are incorporated herein by reference in their entirety.

The spatial coordinates of the centroid of the intensity profile of the pulsed laser beam 112 having a time-averaged intensity profile I(x,y,z) are given by the following expressions:

$$\overline{x}(z) = \frac{\int_{-\infty}^{\infty}\int_{-\infty}^{\infty} x I(x, y, z) dx dy}{\int_{-\infty}^{\infty}\int_{-\infty}^{\infty} I(x, y, z) dx dy} \quad (1)$$

$$\overline{y}(z) = \frac{\int_{-\infty}^{\infty}\int_{-\infty}^{\infty} y I(x, y, z) dx dy}{\int_{-\infty}^{\infty}\int_{-\infty}^{\infty} I(x, y, z) dx dy} \quad (2)$$

These are also known as the first moments of the Wigner distribution and are described in Section 3.5 of ISO 11146-2:2005(E). Their measurement is described in Section 7 of ISO 11146-2:2005(E).

Variance is a measure of the width, in the cross-sectional (X-Y) plane, of the intensity distribution of the pulsed laser beam 112 as a function of position z in the direction of beam propagation. For an arbitrary laser beam, variance in the X-direction may differ from variance in the Y-direction. We let $\sigma_x^2(z)$ and $\sigma_y^2(z)$ represent the variances in the X-direction and Y-direction, respectively. Of particular interest are the variances in the near field and far field limits. We let $\sigma_{0x}^2(z)$ and $\sigma_{0y}^2(z)$ represent variances in the X-direction and Y-direction, respectively, in the near field limit, and we let $\sigma_{\infty x}^2(z)$ and $\sigma_{\infty y}^2(z)$ represent variances in the X-direction and Y-direction, respectively, in the far field limit. For a laser beam having a time-averaged intensity profile I(x,y,z) with Fourier transform $\tilde{I}(v_x, v_y)$ (where $v_x$ and $v_y$ are spatial frequencies in the X-direction and Y-direction, respectively), the near field and far field variances in the X-direction and Y-direction are given by the following expressions:

$$\sigma_{0x}^2(z) = \frac{\int_{-\infty}^{\infty}\int_{-\infty}^{\infty} x^2 I(x, y, z) dx dy}{\int_{-\infty}^{\infty}\int_{-\infty}^{\infty} I(x, y, z) dx dy} \quad (3)$$

$$\sigma_{0y}^2(z) = \frac{\int_{-\infty}^{\infty}\int_{-\infty}^{\infty} y^2 I(x, y, z) dx dy}{\int_{-\infty}^{\infty}\int_{-\infty}^{\infty} I(x, y, z) dx dy} \quad (4)$$

$$\sigma_{\infty x}^2 = \frac{\int_{-\infty}^{\infty}\int_{-\infty}^{\infty} v_x^2 \tilde{I}(v_x, v_y) dv_x dv_y}{\int_{-\infty}^{\infty}\int_{-\infty}^{\infty} \tilde{I}(v_x, v_y) dv_x dv_y} \quad (5)$$

$$\sigma_{\infty y}^2 = \frac{\int_{-\infty}^{\infty}\int_{-\infty}^{\infty} v_y^2 \tilde{I}(v_x, v_y) dv_x dv_y}{\int_{-\infty}^{\infty}\int_{-\infty}^{\infty} \tilde{I}(v_x, v_y) dv_x dv_y} \quad (6)$$

The variance quantities $\sigma_{0x}^2(z)$, $\sigma_{0y}^2(z)$, $\sigma_{\infty x}^2$, and $\sigma_{\infty y}^2$ are also known as the diagonal elements of the Wigner distribution (see ISO 11146-2:2005(E)). These variances can be quantified for an experimental laser beam using the measurement techniques described in Section 7 of ISO 11146-2:2005(E). In brief, the measurement uses a linear unsaturated pixelated detector to measure I(x, y) over a finite spatial region that approximates the infinite integration area of the integral equations which define the variances and the centroid coordinates. The appropriate extent of the measurement area, background subtraction and the detector pixel resolution are determined by the convergence of an iterative measurement procedure described in Section 7 of ISO 11146-2:2005(E). The numerical values of the expressions given by equations 1-6 are calculated numerically from the array of intensity values as measured by the pixelated detector.

Through the Fourier transform relationship between the transverse amplitude profile $\tilde{u}(x,y,z)$ for an arbitrary optical beam (where $I(x,y,z) \equiv |\tilde{u}(x,y,z)|^2$) and the spatial-frequency distribution $\tilde{P}(v_x, v_y, z)$ for an arbitrary optical beam (where $\tilde{I}(v_x, v_y) \equiv |\tilde{P}(v_x, v_y, z)|^2$), it can be shown that:

$$\sigma_x^2(z) = \sigma_{0x}^2(z_{0x}) + \lambda^2 \sigma_{\infty x}^2 (z - z_{0x})^2 \quad (7)$$

$$\sigma_y^2(z) = \sigma_{0y}^2(z_{0y}) + \lambda^2 \sigma_{\infty y}^2 (z - z_{0y})^2 \quad (8)$$

In equations (7) and (8), $\sigma_{0x}^2(z_{0x})$ and $\sigma_{0y}^2(z_{0y})$ are minimum values of $\sigma_{0x}^2(z)$ and $\sigma_{0y}^2(z)$, which occur at waist positions $z_{0x}$ and $z_{0y}$ in the x-direction and y-direction, respectively, and $\lambda$ is the wavelength of the pulsed laser beam 112. Equations (7) and (8) indicate that $\sigma_x^2(z)$ and $\sigma_y^2(z)$ increase quadratically with z in either direction from the minimum values associated with the waist position of the pulsed laser beam 112 (e.g., the waist portion of the pulsed laser beam focal line 113). Further, in the embodiments described herein comprising a beam spot 114 that is axisymmetric and thereby comprises an axisymmetric intensity distribution I(x,y), $\sigma_x^2(z)=\sigma_y^2(z)$ and in the embodiments described herein comprising a beam spot 114 that is non-axisymmetric and thereby comprises a non-axisymmetric intensity distribution I(x,y), $\sigma_x^2(z) \neq \sigma_y^2(z)$, i.e., $\sigma_x^2(z) < \sigma_y^2(z)$ or $\sigma_x^2(z) > \sigma_y^2(z)$.

Equations (7) and (8) can be rewritten in terms of a beam propagation factor $M^2$, where separate beam propagations factors $M_x^2$ and $M_y^2$ for the x-direction and the y-direction are defined as:

$$M_x^2 = 4\pi\sigma_{0x}\sigma_{\infty x} \qquad (9)$$

$$M_y^2 = 4\pi\sigma_{0y}\sigma_{\infty y} \qquad (10)$$

Rearrangement of Equations (9) and (10) and substitution into Equations (7) and (8) yields:

$$\sigma_x^2(z) = \sigma_{0x}^2(z_{0x}) + \frac{\lambda^2 M_x^4}{(4\pi\sigma_{0x})^2}(z-z_{0x})^2 \qquad (11)$$

$$\sigma_y^2(z) = \sigma_{0y}^2(z_{0y}) + \frac{\lambda^2 M_y^4}{(4\pi\sigma_{0y})^2}(z-z_{0y})^2 \qquad (12)$$

which can be rewritten as:

$$\sigma_x^2(z) = \sigma_{0x}^2(z_{0x})\left[1 + \frac{(z-z_{0x})^2}{Z_{Rx}^2}\right] \qquad (13)$$

$$\sigma_y^2(z) = \sigma_{0y}^2(z_{0y})\left[1 + \frac{(z-z_{0y})^2}{Z_{Ry}^2}\right] \qquad (14)$$

where the Rayleigh ranges $Z_{Rx}$ and $Z_{Ry}$ in the x-direction and y-direction, respectively, are given by:

$$Z_{Rx} = \frac{4\pi\sigma_{0x}^2}{M_x^2\lambda} \qquad (15)$$

$$Z_{Ry} = \frac{4\pi\sigma_{0y}^2}{M_y^2\lambda} \qquad (16)$$

The Rayleigh range corresponds to the distance (relative to the position of the beam waist as defined in Section 3.12 of ISO 11146-1:2005(E)) over which the variance of the laser beam doubles (relative to the variance at the position of the beam waist) and is a measure of the divergence of the cross sectional area of the laser beam. Further, in the embodiments described herein comprising a beam spot 114 that is axisymmetric and thereby comprises an axisymmetric intensity distribution I(x,y), $Z_{Rx}=Z_{Ry}$ and in the embodiments described herein comprising a beam spot 114 that is non-axisymmetric and thereby comprises a non-axisymmetric intensity distribution I(x,y), $Z_{Rx} \neq Z_{Ry}$, i.e., $Z_{Rx} < Z_{Ry}$ or $Z_{Rx} > Z_{Ry}$. The Rayleigh range can also be observed as the distance along the beam axis at which the optical intensity decays to one half of its value observed at the beam waist location (location of maximum intensity). Laser beams with large Rayleigh ranges have low divergence and expand more slowly with distance in the beam propagation direction than laser beams with small Rayleigh ranges.

The formulas above can be applied to any laser beam (not just Gaussian beams) by using the intensity profile I(x, y, z) that describes the laser beam. In the case of the $TEM_{00}$ mode of a Gaussian beam, the intensity profile is given by:

$$I(x,y) = \frac{\sqrt{\pi}}{2} w_o e^{\frac{-2(x^2+y^2)}{w_o^2}} \qquad (17)$$

where $w_o$ is the radius (defined as the radius at which beam intensity decreases to $1/e^2$ of the peak beam intensity of the beam at a beam waist position $z_o$. From Equation (17) and the above formulas, we obtain the following results for a $TEM_{00}$ Gaussian beam:

$$\sigma_{0x}^2 = \sigma_{0y}^2 = \frac{w_o^2}{4} \qquad (18)$$

$$\sigma_{\infty x}^2 = \sigma_{\infty y}^2 = \frac{1}{4\pi^2 w_0^2} \qquad (19)$$

$$M_x^2 = 4\pi\sigma_{0x}\sigma_{\infty x} = 1 \qquad (20)$$

$$M_y^2 = 4\pi\sigma_{0y}\sigma_{\infty y} = 1 \qquad (21)$$

$$Z_{Rx} = \frac{4\pi\sigma_{0x}^2}{M_x^2\lambda} = \frac{\pi w_0^2}{\lambda} \qquad (22)$$

$$Z_{Ry} = \frac{4\pi\sigma_{0y}^2}{M_y^2\lambda} = \frac{\pi w_0^2}{\lambda} \qquad (23)$$

$$w^2(z) = w_0^2 + \frac{\lambda^2}{(\pi w_0)^2}(z-z_0)^2 = w_0^2\left[1 + \frac{(z-z_0)^2}{Z_R^2}\right] \qquad (24)$$

where $Z_R = Z_{Rx} = Z_{Ry}$. For Gaussian beams, it is further noted that $M^2 = M_x^2 = M_y^2 = 1$.

Beam cross section is characterized by shape and dimensions. The dimensions of the beam cross section are characterized by a spot size of the beam. For a Gaussian beam, spot size is frequently defined as the radial extent at which the intensity of the beam decreases to $1/e^2$ of its maximum value, denoted in Equation (17) as $w_o$. The maximum intensity of a Gaussian beam occurs at the center (x=0 and y=0 (Cartesian) or r=0 (cylindrical)) of the intensity distribution and radial extent used to determine spot size is measured relative to the center.

Beams with axisymmetric (i.e. rotationally symmetric around the beam propagation axis Z) cross sections can be characterized by a single dimension or spot size that is measured at the beam waist location as specified in Section 3.12 of ISO 11146-1:2005(E). For a Gaussian beam, Equation (17) shows that spot size is equal to $w_o$, which from Equation (18) corresponds to $2\sigma_{0x}$ or $2\sigma_{0y}$. For an axisymmetric beam having an axisymmetric cross section, such as a circular cross section, $\sigma_{0x} = \sigma_{0y}$. Thus, for axisymmetric beams, the cross section dimension may be characterized with a single spot size parameter, where $w_o = 2\sigma_0$. Spot size can be similarly defined for non-axisymmetric beam cross sections where, unlike an axisymmetric beam, $\sigma_{0x} \neq \sigma_{0y}$. Thus, when the spot size of the beam is non-axisymmetric, it is necessary to characterize the cross-sectional dimensions of a non-axisymmetric beam with two spot size parameters: $w_{ox}$ and $w_{oy}$ in the x-direction and y-direction, respectively, where $$w_{ox} = 2\sigma_{0x} \qquad (25)$$

$$w_{oy} = 2\sigma_{0y} \quad (26)$$

Further, the lack of axial (i.e. arbitrary rotation angle) symmetry for a non-axisymmetric beam means that the results of a calculation of values of $\sigma_{0x}$ and $\sigma_{0y}$ will depend on the choice of orientation of the X-axis and Y-axis. ISO 11146-1:2005(E) refers to these reference axes as the principal axes of the power density distribution (Section 3.3-3.5) and in the following discussion we will assume that the X and Y axes are aligned with these principal axes. Further, an angle $\phi$ about which the X-axis and Y-axis may be rotated in the cross-sectional plane (e.g., an angle of the X-axis and Y-axis relative to reference positions for the X-axis and Y-axis, respectively) may be used to define minimum ($w_{o,min}$) and maximum values ($w_{o,max}$) of the spot size parameters for a non-axisymmetric beam:

$$w_{o,min} = 2\sigma_{0,min} \quad (27)$$

$$w_{o,max} = 2\sigma_{0,max} \quad (28)$$

where $2\sigma_{0,min} = 2\sigma_{0x}(\phi_{min,x}) = 2\sigma_{0y}(\phi_{min,y})$ and $2\sigma_{0,max} = 2\sigma_{0x}(\phi_{max,x}) = 2\sigma_{0y}(\phi_{max,y})$ The magnitude of the axial asymmetry of the beam cross section can be quantified by the aspect ratio, where the aspect ratio is defined as the ratio of $w_{o,max}$ to $w_{o,min}$. An axisymmetric beam cross section has an aspect ratio of 1.0, while elliptical and other non-axisymmetric beam cross sections have aspect ratios greater than 1.0, for example, greater than 1.1, greater than 1.2, greater than 1.3, greater than 1.4, greater than 1.5, greater than 1.6, greater than 1.7, greater than 1.8, greater than 1.9, greater than 2.0, greater than 3.0, greater than 5.0, greater than 10.0, such as 1.1 to 2, 1.1 to 1.5, 5, for example, 1.2, 1.5, 1.8, 2, 2.5, 3, 5, or any range having any two of these values as endpoints, or any open-ended range having any of these values as a lower bound.

To promote uniformity of defects 172 in the beam propagation direction (e.g. depth dimension of the transparent mother sheet 160), a pulsed laser beam 112 having low divergence may be used. In one or more embodiments, pulsed laser beams 112 having low divergence may be utilized for forming defects 172. As noted above, divergence can be characterized by the Rayleigh range. For non-axisymmetric beams, Rayleigh ranges for the principal axes X and Y are defined by Equations (15) and (16) for the X-direction and Y-direction, respectively, where it can be shown that for any real beam, $M_x^2 \geq 1$ and $M_y^2 \geq 1$ and where $\sigma_{0x}^2$ and $\sigma_{0y}^2$ are determined by the intensity distribution of the laser beam. For symmetric beams, Rayleigh range is the same in the X-direction and Y-direction and is expressed by Equation (22) or Equation (23). Low divergence correlates with large values of the Rayleigh range and weak diffraction of the laser beam.

Beams with Gaussian intensity profiles may be less preferred for laser processing to form defects 172 because, when focused to small enough spot sizes (such as spot sizes in the range of microns, such as about 1-5 µm or about 1-10 µm) to enable available laser pulse energies to modify materials such as glass, they are highly diffracting and diverge significantly over short propagation distances. To achieve low divergence, it is desirable to control or optimize the intensity distribution of the pulsed laser beam to reduce diffraction. Pulsed laser beams may be non-diffracting or weakly diffracting. Weakly diffracting laser beams include quasi-non-diffracting laser beams. Representative weakly diffracting laser beams include Bessel beams, Gauss-Bessel beams, Airy beams, Weber beams, and Mathieu beams.

For non-axisymmetric beams, the Rayleigh ranges $Z_{Rx}$ and $Z_{Ry}$ are unequal. Equations (15) and (16) indicate that $Z_{Rx}$ and $Z_{Ry}$ depend on $\sigma_{0x}$ and $\sigma_{0y}$, respectively, and above we noted that the values of $\sigma_{0x}$ and $\sigma_{0y}$ depend on the orientation of the X-axis and Y-axis. The values of $Z_{Rx}$ and $Z_{Ry}$ will accordingly vary, and each will have a minimum value and a maximum value that correspond to the principal axes, with the minimum value of $Z_{Rx}$ being denoted as $Z_{Rx,min}$ and the minimum value of $Z_{Ry}$ being denoted $Z_{Ry,min}$ for an arbitrary beam profile $Z_{Rx,min}$ and $Z_{Ry,min}$ can be shown to be given by $$Z_{Rx,min} = \frac{4\pi\sigma_{0,min}^2}{M_x^2 \lambda} \quad (29)$$

and $$Z_{Ry,min} = \frac{4\pi\sigma_{0,min}^2}{M_y^2 \lambda} \quad (30)$$

Since divergence of the laser beam occurs over a shorter distance in the direction having the smallest Rayleigh range, the intensity distribution of the pulsed laser beam 112 used to form defects 172 may be controlled so that the minimum values of $Z_{Rx}$ and $Z_{Ry}$ (or for axisymmetric beams, the value of $Z_R$) are as large as possible. Since the minimum value $Z_{Rx,min}$ of $Z_{Rx}$ and the minimum value $Z_{Ry,min}$ of $Z_{Ry}$ differ for a non-axisymmetric beam, a pulsed laser beam 112 may be used with an intensity distribution that makes the smaller of $Z_{Rx,min}$ and $Z_{Ry,min}$ as large as possible when forming damage regions.

In different embodiments, the smaller of $Z_{Rx,min}$ and $Z_{Ry,min}$ (or for axisymmetric beams, the value of $Z_R$) is greater than or equal to 50 µm, greater than or equal to 100 µm, greater than or equal to 200 µm, greater than or equal to 300 µm, greater than or equal to 500 µm, greater than or equal to 1 mm, greater than or equal to 2 mm, greater than or equal to 3 mm, greater than or equal to 5 mm, such as from 50 µm to 10 mm, from 100 µm to 5 mm, from 200 µm to 4 mm, or from 300 µm to 2 mm, for example, 100 µm, 250 µm, 500 µm, 750 µm, 1 mm, 2.5 mm, 5 mm, or any range having any two of these values as endpoints, or any open-ended range having any of these values as a lower bound.

The values and ranges for the smaller of $Z_{Rx,min}$ and $Z_{Ry,min}$ (or for axisymmetric beams, the value of $Z_R$) specified herein are achievable for different wavelengths to which the workpiece is transparent through adjustment of the spot size parameter $w_{o,min}$ defined in Equation (27). In different embodiments, the spot size parameter $w_{o,min}$ is greater than or equal to 0.25 µm, greater than or equal to 0.5 µm, greater than or equal to 1 µm, greater than or equal to 2 µm, greater than or equal to 5 µm, such as from 0.25 µm to 10 µm, from 0.25 µm to 5 µm, from 0.25 µm to 2.5 µm, from 0.5 µm to 10 µm, from 0.5 µm to 2.5 µm, from 0.75 µm to 5 µm, or from 0.75 µm to 2.5 µm, for example, 0.25 µm, 0.50 µm, 0.75 µm, 1 µm, 1.5 µm, 2.5 µm, 5 µm, 7.5 µm, 10 µm, or any range having any two of these values as endpoints, or any open-ended range having any of these values as a lower bound.

Non-diffracting or quasi non-diffracting beams generally have complicated intensity profiles, such as those that decrease non-monotonically vs. radius. By analogy to a Gaussian beam, an effective spot size $w_{o,eff}$ can be defined for non-axisymmetric beams as the shortest radial distance, in any direction, from the radial position of the maximum intensity (r=0) at which the intensity decreases to $1/e^2$ of the maximum intensity. Further, for axisymmetric beams $w_{o,eff}$ is the radial distance from the radial position of the maximum intensity (r=0) at which the intensity decreases to $1/e^2$ of the maximum intensity. A criterion for Rayleigh range based on the effective spot size $w_{o,eff}$ for non-axisymmetric beams or the spot size $w_o$ for axisymmetric beams can be specified as non-diffracting or quasi non-diffracting beams for forming damage regions using equation (31) for non-axisymmetric beams of equation (32) for axisymmetric beams, below:

$$\text{Smaller of } Z_{Rx,min}, Z_{Ry,min} > F_D \frac{\pi w_{0,eff}^2}{\lambda} \quad (31)$$

$$Z_R > F_D \frac{\pi w_0^2}{\lambda} \quad (32)$$

where $F_D$ is a dimensionless divergence factor having a value of 10 or greater, 50 or greater, 100 or greater, 250 or greater, 500 or greater, 1000 or greater, such as from 10 to 2000, from 50 to 1500, or from 100 to 1000, for example, 10, 25, 50, 75, 100, 250, 300, 500, 750, 900, 1000, 1250, 1500, 2000, or any range having any two of these values as endpoints, or any open-ended range having any of these values as a lower bound. By comparing Equation (31) to Equation (22) or (23), one can see that for a non-diffracting or quasi non-diffracting beam the distance, Smaller of $Z_{R,min}$, $Z_{Ry,min}$ in Equation (31), over which the effective beam size doubles, is $F_D$ times the distance expected if a typical Gaussian beam profile were used. The dimensionless divergence factor $F_D$ provides a criterion for determining whether or not a laser beam is quasi-non-diffracting. As used herein, the pulsed laser beam 112 is considered quasi-non-diffracting if the characteristics of the laser beam satisfy Equation (31) or Equation (32) with a value of $F_D \geq 10$. As the value of $F_D$ increases, the pulsed laser beam 112 approaches a more nearly perfectly non-diffracting state. Moreover, it should be understood that Equation (32) is merely a simplification of Equation (31) and as such, Equation (31) mathematically describes the dimensionless divergence factor $F_D$ for both axisymmetric and non-axisymmetric pulsed laser beams 112.

Referring now to FIG. 6, an optical assembly 100 for producing a pulsed laser beam 112 that that is quasi-non-diffracting and forms the pulsed laser beam focal line 113 at the transparent mother sheet 160 using the aspheric optical element 120 (e.g., an axicon 122) is schematically depicted. The optical assembly 100 includes a beam source 110 that outputs the pulsed laser beam 112, and a first and second lens 130, 132.

Further, the transparent mother sheet 160 may be positioned such that the pulsed laser beam 112 output by the beam source 110 irradiates the transparent mother sheet 160, for example, after traversing the aspheric optical element 120 and thereafter, both the first lens 130 and the second lens 132. An optical axis 102 extends between the beam source 110 and the transparent mother sheet 160 along the Z-axis such that when the beam source 110 outputs the pulsed laser beam 112, the beam pathway 111 of the pulsed laser beam 112 extends along the optical axis 102. As used herein "upstream" and "downstream" refer to the relative position of two locations or components along the beam pathway 111 with respect to the beam source 110. For example, a first component is upstream from a second component if the pulsed laser beam 112 traverses the first component before traversing the second component. Further, a first component is downstream from a second component if the pulsed laser beam 112 traverses the second component before traversing the first component.

Referring still to FIG. 6, the beam source 110 may comprise any known or yet to be developed beam source 110 (e.g., a pulsed beam source) configured to output pulsed laser beams 112. In operation, the defects 172 of the contour 170 (FIG. 5A) are produced by interaction of the transparent mother sheet 160 with the pulsed laser beam 112 output by the beam source 110. In some embodiments, the beam source 110 may output a pulsed laser beam 112 comprising a wavelength of for example, 1064 nm, 1030 nm, 532 nm, 530 nm, 355 nm, 343 nm, or 266 nm, or 215 nm. Further, the pulsed laser beam 112 used to form defects 172 in the transparent mother sheet 160 may be well suited for materials that are transparent to the selected pulsed laser wavelength.

Suitable laser wavelengths for forming defects 172 are wavelengths at which the combined losses of linear absorption and scattering by the transparent mother sheet 160 are sufficiently low. In embodiments, the combined losses due to linear absorption and scattering by the transparent mother sheet 160 at the wavelength are less than 20%/mm, or less than 15%/mm, or less than 10%/mm, or less than 5%/mm, or less than 1%/mm, such as 0.5%/mm to 20%/mm, 1%/mm to 10%/mm, or 1%/mm to 5%/mm, for example, 1%/mm, 2.5%/mm, 5%/mm, 10%/mm, 15%/mm, or any range having any two of these values as endpoints, or any open-ended range having any of these values as a lower bound. As used herein, the dimension "/mm" means per millimeter of distance within the transparent mother sheet 160 in the beam propagation direction of the pulsed laser beam 112 (e.g., the Z direction). Representative wavelengths for many glass workpieces include fundamental and harmonic wavelengths of $Nd^{3+}$ (e.g. $Nd^{3+}$:YAG or $Nd^{3+}$:YVO$_4$ having fundamental wavelength near 1064 nm and higher order harmonic wavelengths near 532 nm, 355 nm, and 266 nm). Other wavelengths in the ultraviolet, visible, and infrared portions of the spectrum that satisfy the combined linear absorption and scattering loss requirement for a given substrate material can also be used.

In operation, the pulsed laser beam 112 output by the beam source 110 may create multi-photon absorption (MPA) in the transparent mother sheet 160. MPA is the simultaneous absorption of two or more photons of identical or different frequencies that excites a molecule from one state (usually the ground state) to a higher energy electronic state (i.e., ionization). The energy difference between the involved lower and upper states of the molecule is equal to the sum of the energies of the involved photons. MPA, also called induced absorption, can be a second-order or third-order process (or higher order), for example, that is several orders of magnitude weaker than linear absorption. It differs from linear absorption in that the strength of second-order induced absorption may be proportional to the square of the light intensity, for example, and thus it is a nonlinear optical process.

The perforation step that creates the one or more contours 170 (FIG. 5A) may utilize the beam source 110 (e.g., an ultra-short pulse laser) in combination with the aspheric optical element 120, the first lens 130, and the second lens 132, to project the beam spot 114 on the transparent mother sheet 160 and generate the pulsed laser beam focal line 113. The pulsed laser beam focal line 113 comprises a quasi-non-diffracting beam, such as a Gauss-Bessel beam or Bessel beam, as defined above, and may fully perforate the transparent mother sheet 160 to form defects 172 in the transparent mother sheet 160, which may form the contour 170. In some embodiments, the pulse duration of the individual pulses is in a range of from 1 femtosecond to 200 picoseconds, such as from 1 picosecond to 100 picoseconds, 5 picoseconds to 20 picoseconds, for example, 10 femtoseconds, 50 femtoseconds, 100 femtoseconds, 500 femtoseconds, 10 picoseconds, 50 picoseconds, or any range having any two of these values as endpoints, or any open-ended range having any of these values as a lower bound. Further, the repetition rate of the individual pulses may be in a range from 1 kHz to 4 MHz, such as from 10 kHz to 3 MHz, or from 10 kHz to 650 kHz, such as 50 kHz, 100 kHz, 250 kHz, 500 kHz, 750 kHz, 1 MHz, 2 MHz, 3 MHz, 4 MHz, or any range having any two of these values as endpoints, or any open-ended range having any of these values as a lower bound.

Referring also to FIGS. 7A and 7B, in addition to a single pulse operation at the aforementioned individual pulse repetition rates, the pulses may be produced in pulse bursts 500 of two pulses 500A (e.g., sub-pulses) or more per pulse burst, such as from 2 to 30 sub-pulses per pulse burst 500 or from 5 to 20 sub-pulses per pulse burst 500, for example, 2 sub-pulses, 3 sub-pulses, 4 sub-pulses, 5 sub-pulses, 10 sub-pulses, 15 sub-pulses, 20 sub-pulses, 25 sub-pulses, or any range having any two of these values as endpoints, or any open-ended range having any of these values as a lower bound. While not intending to be limited by theory, a pulse burst is a short and fast grouping of sub-pulses that creates an optical energy interaction with the material (i.e. MPA in the material of the transparent mother sheet 160) on a time scale not easily accessible using a single-pulse operation. While still not intending to be limited by theory, the energy within a pulse burst (i.e. a group of pulses) is conserved. As an illustrative example, for a pulse burst having an energy of 100 μJ/burst and 2 sub-pulses, the 100 μJ/burst energy is split between the 2 pulses for an average energy of 50 μJ per sub-pulse and for a pulse burst having an energy of 100 μJ/burst and 10 sub-pulses, the 100 μJ/burst is split amongst the 10 sub-pulses for an average energy of 10 μJ per sub-pulse. Further, the energy distribution among the sub-pulses of a pulse burst does not need to be uniform. In fact, in some instances, the energy distribution among the sub-pulses of a pulse burst is in the form of an exponential decay, where the first sub-pulse of the pulse burst contains the most energy, the second sub-pulse of the pulse burst contains slightly less energy, the third sub-pulse of the pulse burst contains even less energy, and so on. However, other energy distributions within an individual pulse burst are also possible, where the exact energy of each sub-pulse can be tailored to effect different amounts of modification to the transparent mother sheet 160.

While still not intending to be limited by theory, when the defects 172 of the one or more contours 170 are formed with pulse bursts having at least two sub-pulses, the force necessary to separate the transparent mother sheet 160 along is contour 170 (i.e. the maximum break resistance) is reduced compared to the maximum break resistance of a contour 170 of the same shape with the same spacing between adjacent defects 172 in an identical transparent mother sheet 160 that is formed using a single pulse laser. For example, the maximum break resistance of a contour 170 formed using a single pulse is at least two times greater than the maximum break resistance of a contour 170 formed using a pulse burst having 2 or more sub-pulses. Further, the difference in maximum break resistance between a contour 170 formed using a single pulse and a contour 170 formed using a pulse burst having 2 sub-pulses is greater than the difference in maximum break resistance between a contour 170 formed using a pulse burst having 2 sub-pulses and a pulse burst having 3 sub-pulses. Thus, pulse bursts may be used to form contours 170 that separate easier than contours 170 formed using a single pulse laser.

Referring still to FIGS. 7A and 7B, the sub-pulses 500A within the pulse burst 500 may be separated by a duration that is in a range from 1 nsec to 100 psec, such as 1 nsec to 50 nsec, 10 nsec to 30 nsec, such as 20 nsec, 50 nsec, 100 nsec, 500 nsec, 1 psec, 5 psec, 10 psec, 15 psec, 18 psec, 20 psec, 22 psec, 25 psec, 30 psec, 50 psec, 75 psec, or any range having any two of these values as endpoints, or any open-ended range having any of these values as a lower bound. For a given laser, the time separation $T_p$ (FIG. 4B) between adjacent sub-pulses 500A within a pulse burst 500 may be relatively uniform (e.g., within about 10% of one another). For example, in some embodiments, each sub-pulse 500A within a pulse burst 500 is separated in time from the subsequent sub-pulse by approximately 20 nsec (50 MHz). Further, the time between each pulse burst 500 may be from about 0.25 microseconds to about 1000 microseconds, e.g., from about 1 microsecond to about 10 microseconds, or from about 3 microseconds to about 8 microseconds.

In some of the exemplary embodiments of the beam source 110 described herein, the time separation $T_b$ (FIG. 7B) is about 5 microseconds for the beam source 110 outputting a pulsed laser beam 112 comprising a burst repetition rate of about 200 kHz. The laser burst repetition rate is related to the time $T_b$ between the first pulse in a burst to the first pulse in the subsequent burst (laser burst repetition rate=$1/T_b$). In some embodiments, the laser burst repetition rate may be in a range of from 1 kHz to 4 MHz, such as from 10 kHz to 650 kHz, for example 50 kHz, 100 kHz, 250 kHz, 500 kHz, 750 kHz, 1 MHz, 2 MHz, 3 MHz, 4 MHz, or any range having any two of these values as endpoints, or any open-ended range having any of these values as a lower bound. The time $T_b$ between the first pulse in each burst to the first pulse in the subsequent burst may be from 0.25 microseconds (4 MHz burst repetition rate) to 1000 microseconds (1 kHz burst repetition rate), such as from 0.5 microseconds (2 MHz burst repetition rate) to 40 microseconds (25 kHz burst repetition rate), or from 2 microseconds (500 kHz burst repetition rate) to 20 microseconds (50 k Hz burst repetition rate), 0.5 microseconds, 5 microseconds, 10 microseconds, 15 microseconds, 25 microseconds, 50 microseconds, 100 microseconds, 150 microseconds, or any range having any two of these values as endpoints, or any open-ended range having any of these values as a lower bound. The exact timing, pulse duration, and burst repetition rate may vary depending on the laser design, but short pulses ($T_d$<20 psec and, in some embodiments, $T_d$15 psec) of high intensity have been shown to work particularly well.

The burst repetition rate may be in a range of from 1 kHz to 2 MHz, such as from 1 kHz to 200 kHz. Bursting or producing pulse bursts 500 is a type of laser operation where the emission of sub-pulses 500A is not in a uniform and steady stream but rather in tight clusters of pulse bursts 500. The pulse burst laser beam may have a wavelength selected based on the material of the transparent mother sheet 160 being operated on such that the material of the transparent mother sheet 160 is substantially transparent at the wavelength. The average laser power per burst measured at the material may be at least 40 μJ per mm of thickness of material. For example, in embodiments, the average laser power per burst may be from 40 μJ/mm to 2500 μJ/mm, or from 500 µJ/mm to 2250 µJ/mm. In a specific example, for 0.5 mm to 0.7 mm thick Corning EAGLE XG® transparent workpiece, pulse bursts of from 300 µJ to 600 µJ may cut and/or separate the workpiece, which corresponds to an exemplary range of 428 µJ/mm to 1200 µJ/mm (i.e., 300 µJ/0.7 mm for 0.7 mm EAGLE XG® glass and 600 µJ/0.5 mm for a 0.5 mm EAGLE XG® glass).

The energy required to modify the transparent mother sheet 160 is the pulse energy, which may be described in terms of pules burst energy (i.e., the energy contained within a pulse burst 500 where each pulse burst 500 contains a series of sub-pulses 500A), or in terms of the energy contained within a single laser pulse (many of which may comprise a burst). The pulse energy (for example, pulse burst energy) may be from 25 µJ to 750 µJ, such as from 100 µJ to 600 µJ, 50 µJ to 500 µJ, or from 50 µJ to 250 µJ, for example, 25 µJ, 50 µJ, 75 µJ, 100 µJ, 200 µJ, 250 µJ, 300 µJ, 400 µJ, 500 µJ, 600 µJ, 750 µJ, or any range having any two of these values as endpoints, or any open-ended range having any of these values as a lower bound. For some glass compositions, the pulse energy (e.g., pulse burst energy) may be from 100 µJ to 250 µJ. However, for display or TFT glass compositions, the pulse energy (e.g., pulse burst energy) may be higher (e.g., from 300 µJ to 500 µJ, or from 400 µJ to 600 µJ, depending on the specific glass composition of the transparent mother sheet 160).

While not intending to be limited by theory, the use of a pulsed laser beam 112 capable of generating pulse bursts is advantageous for cutting or modifying transparent materials, for example glass (e.g., the transparent mother sheet 160). In contrast with the use of single pulses spaced apart in time by the repetition rate of the single-pulsed laser, the use of a burst sequence that spreads the pulse energy over a rapid sequence of pulses within the burst allows access to larger timescales of high intensity interaction with the material than is possible with single-pulse lasers. The use of pulse bursts (as opposed to a single pulse operation) increases the size (e.g., the cross-sectional size) of the defects 172, which facilitates the connection of adjacent defects 172 when separating the transparent mother sheet 160 along the one or more contours 170 to form the transparent article 161, thereby minimizing crack formation in the transparent article 161, such that the transparent article 161 may be chip free. Further, using a pulse burst to form defects 172 increases the randomness of the orientation of cracks extending outward from each defect 172 into the bulk material of the transparent mother sheet 160 such that individual cracks extending outward from defects 172 do not influence or otherwise bias the separation of the contour 170 to form the corresponding transparent article 161 such that separation of the defects 172 follows the contour 170, minimizing the formation of cracks extending into the transparent articles 161 and the remaining transparent mother sheet 160 (i.e. the trim portion 163 of the transparent mother sheet 160).

Referring again to FIG. 6, the aspheric optical element 120 is positioned within the beam pathway 111 between the beam source 110 and the transparent mother sheet 160. In operation, propagating the pulsed laser beam 112, e.g., an incoming Gaussian beam, through the aspheric optical element 120 may alter the pulsed laser beam 112 such that the portion of the pulsed laser beam 112 propagating beyond the aspheric optical element 120 is quasi-non-diffracting, as described above. The aspheric optical element 120 may comprise any optical element comprising an aspherical shape. In some embodiments, the aspheric optical element 120 may comprise a conical wavefront producing optical element, such as an axicon lens, for example, a negative refractive axicon lens (e.g., negative axicon), a positive refractive axicon lens, a reflective axicon lens, a diffractive axicon lens, a programmable spatial light modulator axicon lens (e.g., a phase axicon), or the like.

In some embodiments, when the aspheric optical element 120 comprises an axicon 122 (as depicted in FIG. 6), the axicon 122 may have a laser output surface 126 (e.g., conical surface) having an angle of about 1.2°, the angle measured relative to the laser input surface 124 (e.g., flat surface) upon which the pulsed laser beam 112 enters the axicon 122. The angle may be from 0.5° to 5°, such as from 1 to 1.5°, or from 0.5° to 20°, for example, 0.5°, 1, 1.5°, 2°, 2.5°, 5°, 7.5°, 10°, 15°, or any range having any two of these values as endpoints, or any open-ended range having any of these values as a lower bound. Further, the laser output surface 126 terminates at a conical tip. Moreover, the aspheric optical element 120 includes a centerline axis 125 extending from the laser input surface 124 to the laser output surface 126 and terminating at the conical tip. In other embodiments, the aspheric optical element 120 may comprise a spatial phase modulator such as a spatial light modulator, or a diffractive optical grating. In operation, the aspheric optical element 120 shapes the incoming pulsed laser beam 112 (e.g., an incoming Gaussian beam) into a quasi-non-diffracting beam, which, in turn, is directed through the first lens 130 and the second lens 132.

Referring still to FIG. 6, the first lens 130 is positioned upstream the second lens 132 and may collimate the pulsed laser beam 112 within a collimation space 134 between the first lens 130 and the second lens 132. Further, the second lens 132 may focus the pulsed laser beam 112 into the transparent mother sheet 160, which may be positioned at an imaging plane 104. In some embodiments, the first lens 130 and the second lens 132 each comprise plano-convex lenses. When the first lens 130 and the second lens 132 each comprise plano-convex lenses, the curvature of the first lens 130 and the second lens 132 may each be oriented toward the collimation space 134. In other embodiments, the first lens 130 may comprise other collimating lenses and the second lens 132 may comprise a meniscus lens, an asphere, or another higher-order corrected focusing lens.

Figure 8:
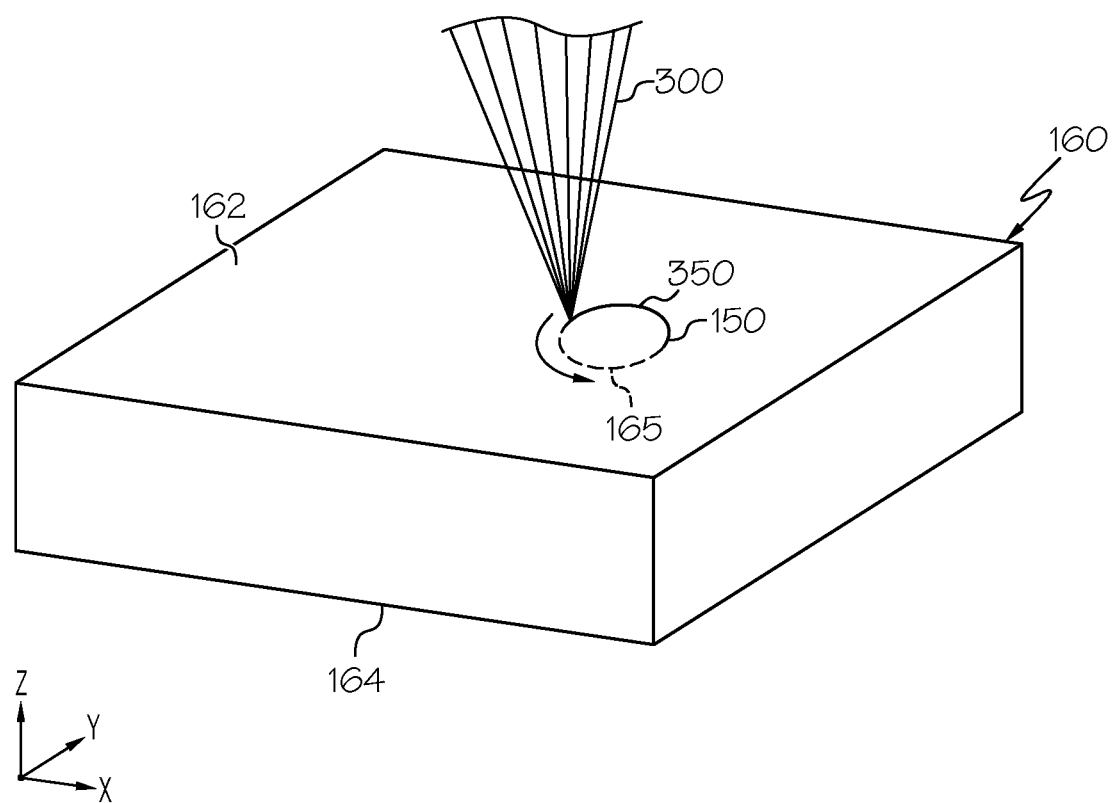
FIG. 8 schematically depicts formation of a damage path in a transparent mother sheet using an ablation laser according to one or more embodiments described herein.
Figure 9:
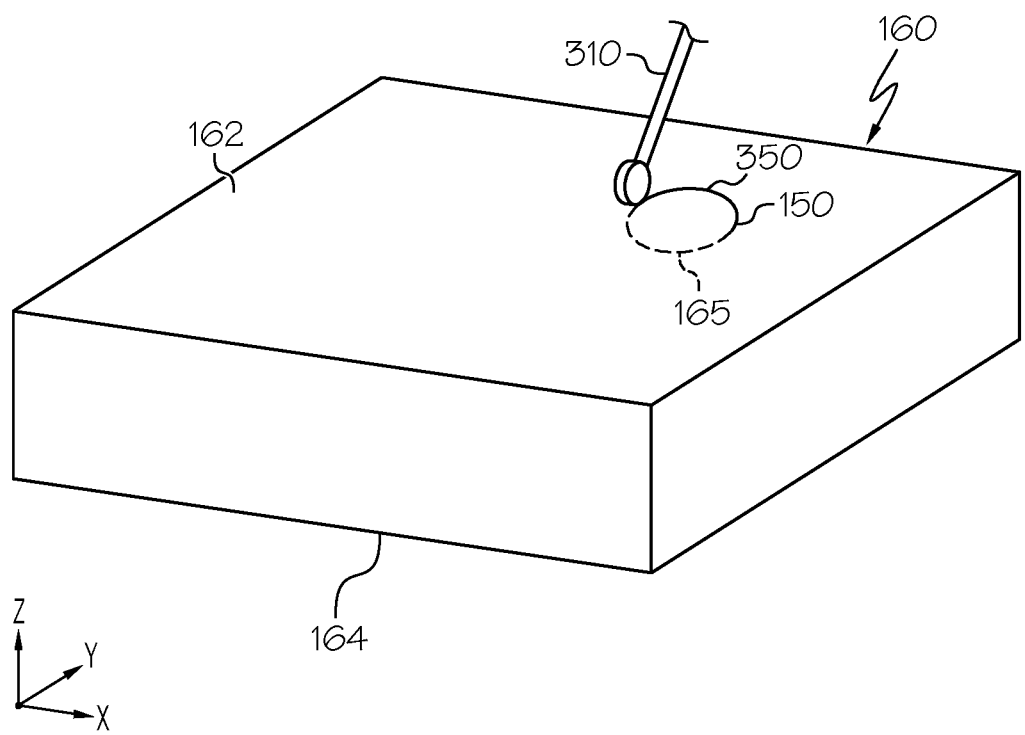
FIG. 9 schematically depicts formation of a damage path in a transparent mother sheet using a mechanical scoring device according to one or more embodiments described herein.

Referring now to FIG. 8, in some embodiments, the damage path 150 comprises the score line 350, which may be formed by the ablation laser 300. For example, forming the score line 350 may first comprise directing the ablation laser 300 onto the first surface 162 of the transparent mother sheet 160 or onto the second surface 164 of the transparent mother sheet 160 to ablate glass material from the first surface 162 or the second surface 164 of the transparent mother sheet 160. Forming the score line 350 also includes translating at least one of the transparent mother sheet 160 and the ablation laser 300 relative to each other along the contour line 165, thereby ablating glass material from the surface of the transparent mother sheet 160 along the contour line 165 to form score line 350. In some embodiments, the ablation laser 300 may comprise a continuous wave laser beam, such as an infrared laser beam, and in other embodiments, the ablation laser 300 may comprise a pulsed laser beam, for example, any of the pulsed laser beams described herein, having sufficient laser power to ablate material of the transparent mother sheet 160. In some embodiments, ablating material from the first surface 162 or the second surface 164 of the transparent mother sheet 160 merely roughens portions of the first surface 162 or the second surface 164 and in other embodiments, ablating material from the first surface 162 or the second surface 164 of the transparent mother sheet 160 forms a groove extending into the first surface 162 or the second surface 164.

Referring now to FIG. 9, in some embodiments, the damage path 150 comprises the score line 350, which may be formed mechanically using the mechanical scoring device 310. For example, forming the score line 350 comprises contacting the first surface 162, the second surface 164, or both, of the transparent mother sheet 160 with the mechanical scoring device 310 and translating at least one of the transparent mother sheet 160 and the mechanical scoring device 310 relative to each other along the contour line 165 thereby modifying the first surface 162, the second surface 164, or both, of the transparent mother sheet 160 along the contour line 165, forming the score line 350. In some embodiments, the mechanical scoring device 310 may comprise a grinding element (such as a grinding wheel), a scoring wheel, or the like. In some embodiments, the mechanical scoring device 310 merely roughens portions of the first surface 162 or the second surface 164 of the transparent mother sheet 160 and in other embodiments, the mechanical scoring device 310 forms a groove extending into the first surface 162 or the second surface 164 of the transparent mother sheet 160.

In view of the foregoing description, it should be understood that forming and processing transparent articles from a transparent mother sheet may be enhanced by an open ended pressure assembly that may be positioned in contact with the transparent mother sheet to form a shell cavity and may be used to reduce pressure in the shell cavity to stress the transparent mother sheet, which includes a damage path, such as a closed damage path. The stress, which may be shear stress and/or flexural stress initiates crack propagation along the damage path to separate a transparent article from the transparent mother sheet. Using the open ended pressure assembly to initiate crack propagation along a damage path formed in a transparent mother sheet facilitates fast and efficient separation of one or more transparent articles from the transparent mother sheet without reducing the edge strength and overall quality of the transparent article separated from the transparent mother sheet.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is included. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of separating a transparent mother sheet, the method comprising:
contacting a first surface of the transparent mother sheet with an open ended pressure assembly comprising a pressure vessel shell, thereby forming a shell cavity defined by the first surface of the transparent mother sheet and the pressure vessel shell, wherein the transparent mother sheet comprises a closed damage path;
removing gas from the shell cavity through a fluid removal outlet extending through the pressure vessel shell to reduce a cavity pressure in the shell cavity, thereby applying stress to the damage path to separate a portion of the transparent mother sheet along the damage path; and
maintaining contact of the separated portion with a membrane skirt of the open ended pressure assembly after separation of the separated portion from a remainder of the transparent mother sheet and while transporting the separated portion away from the remainder of the transparent mother sheet.

2. The method of claim 1, wherein a perimeter of the shell cavity is located radially exterior of the close damage path.

3. The method of claim 1, wherein reducing the cavity pressure in the shell cavity flexes the transparent mother sheet thereby applying multi-axial stress to the damage path.

4. The method of claim 1, wherein:
the pressure vessel shell comprises an outer surface, an inner surface, and an end surface; and
the fluid removal outlet extends from the outer surface to the inner surface.

5. The method of claim 1, wherein when contacting the first surface of the transparent mother sheet with the open ended pressure assembly, the damage path circumscribes the pressure vessel shell.

6. The method of claim 1, wherein:
the membrane skirt comprises an outer edge and an interior hole comprising a hole perimeter; and
when contacting the first surface of the transparent mother sheet with the open ended pressure assembly the damage path circumscribes the hole perimeter of the interior hole of the membrane skirt.

7. The method of claim 1, further comprising forming the damage path in the transparent mother sheet before contacting the first surface of the transparent mother sheet with the open ended pressure assembly, wherein the damage path is a contour comprising a plurality of defects in the transparent mother sheet and forming the contour comprises:

directing a pulsed laser beam oriented along a beam pathway and output by a beam source into the transparent mother sheet such that a portion of the pulsed laser beam directed into the transparent mother sheet comprises a pulsed laser beam focal line and generates an induced absorption within the transparent mother sheet, the induced absorption producing a defect within the transparent mother sheet; and translating at least one of the transparent mother sheet and the pulsed laser beam relative to each other along a contour line, thereby laser forming defects along the contour line within the transparent mother sheet.

8. The method of claim 7, wherein the pulsed laser beam traverses an aspheric optical element before irradiating the transparent mother sheet.

9. The method of claim 7, wherein the pulsed laser beam focal line comprises:
a wavelength $\lambda$;
a spot size $w_o$; and
a Rayleigh range $Z_R$ that is greater than $$F_D \frac{\pi w_0^2}{\lambda},$$

where $F_D$ is a dimensionless divergence factor comprising a value of 10 or greater.

10. The method of claim 1, further comprising forming the damage path in the transparent mother sheet before contacting the first surface of the transparent mother sheet with the open ended pressure assembly, wherein the damage path is a score line extending into the first surface or a second surface of the transparent mother sheet.

11. The method of claim 10, wherein forming the score line comprises:
engaging the first surface or the second surface of the transparent mother sheet with a mechanical scoring device; and
translating at least one of the transparent mother sheet and the mechanical scoring device relative to each other, thereby scoring the first surface or the second surface of the transparent mother sheet and forming the score line.

12. The method of claim 10, wherein forming the score line comprises:
directing an ablation laser onto the first surface or the second surface of the transparent mother sheet to ablate glass material from the first surface of the second surface of the transparent mother sheet; and
translating at least one of the transparent mother sheet and the ablation laser relative to each other, thereby ablating glass material from the first surface or the second surface of the transparent mother sheet and forming the score line.

13. The method of claim 1, wherein:
the damage path is a first damage path and the transparent mother sheet further comprises a second damage path;
removing gas from the shell cavity to reduce the cavity pressure in the shell cavity applies stress to the first damage path and the second damage path to separate the transparent mother sheet along the first damage path and the second damage path;
the membrane skirt comprises an outer edge and a plurality of interior holes, each interior hole comprising a hole perimeter; and
when contacting the first surface of the transparent mother sheet with the open ended pressure assembly each damage path circumscribes the hole perimeter of an interior hole of the membrane skirt.

14. The method of claim 1, wherein the damage path comprises a break resistance of 20 MPa or less and the break resistance is a directionally homogenous break resistance.

15. A method of separating a transparent mother sheet, the method comprising:
laser forming a contour of defects in the transparent mother sheet;
contacting a first surface of the transparent mother sheet with an open ended pressure assembly comprising a pressure vessel shell and a membrane skirt, thereby forming a shell cavity defined by the first surface of the transparent mother sheet and the pressure vessel shell, wherein:
the pressure vessel shell comprises an outer surface, an inner surface, an end surface, and a fluid removal outlet extending from the outer surface to the inner surface; and
the membrane skirt is coupled to the end surface of the pressure vessel shell and comprises a plurality of interior holes;
removing gas from the shell cavity through the fluid removal outlet to reduce a cavity pressure in the shell cavity, thereby applying stress to the contour of defects to initiate crack propagation along the contour of defects and separate a portion of the transparent mother sheet; and
maintaining contact of the separated portion with the membrane skirt of the open ended pressure assembly after separation of the separated portion from a remainder of the transparent mother sheet and while transporting the separated portion away from the remainder of the transparent mother sheet.

16. The method of claim 15, wherein laser forming the contour of defects comprises:
directing a pulsed laser beam oriented along a beam pathway and output by a beam source into the transparent mother sheet such that a portion of the pulsed laser beam directed into the transparent mother sheet comprises a pulsed laser beam focal line and generates an induced absorption within the transparent mother sheet, the induced absorption producing a defect within the transparent mother sheet; and
translating at least one of the transparent mother sheet and the pulsed laser beam relative to each other along a contour line, thereby laser forming defects along the contour line within the transparent mother sheet and wherein the pulsed laser beam focal line comprises:
a wavelength $\lambda$;
a spot size $w_o$; and
a Rayleigh range $Z_R$ that is greater than $$F_D \frac{\pi w_0^2}{\lambda},$$

where $F_D$ is a dimensionless divergence factor comprising a value of 10 or greater.

17. The method of claim 15, wherein crack propagation along the contour of defects initiates at multiple locations along the contour of defects.

18. The method of claim 15, wherein the transparent mother sheet separates along the contour of defects in a separation time comprising less than 1 second.

\* \* \* \* \*